(12) United States Patent
Ling et al.

(10) Patent No.: US 11,399,167 B2
(45) Date of Patent: Jul. 26, 2022

(54) METHODS AND DEVICES FOR PROCESSING IMAGES

(71) Applicant: ZHEJIANG DAHUA TECHNOLOGY CO., LTD., Zhejiang (CN)

(72) Inventors: Chen Ling, Hangzhou (CN); Dan Zhang, Hangzhou (CN); Xin Ma, Hangzhou (CN); Wei Fang, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 251 days.

(21) Appl. No.: 16/852,575

(22) Filed: Apr. 20, 2020

(65) Prior Publication Data

US 2020/0244939 A1    Jul. 30, 2020

Related U.S. Application Data

(63) Continuation of application No. PCT/CN2018/110341, filed on Oct. 16, 2018.

(30) Foreign Application Priority Data

Oct. 19, 2017   (CN) .......................... 201710976159.0
Dec. 15, 2017   (CN) .......................... 201711352453.0

(51) Int. Cl.
*H04N 9/64* (2006.01)
*H04N 9/04* (2006.01)

(52) U.S. Cl.
CPC ............... *H04N 9/646* (2013.01); *H04N 9/04* (2013.01)

(58) Field of Classification Search
CPC ...................................................... H04N 9/646
(Continued)

(56) References Cited

U.S. PATENT DOCUMENTS 9,131,196 B2   9/2015   Lim et al.
9,756,266 B2   9/2017   Mills et al.
(Continued)

FOREIGN PATENT DOCUMENTS

CN   100425055 C   10/2008
CN   101478687 A    7/2009
(Continued)

OTHER PUBLICATIONS

International Search Report in PCT/CN2018/110341 dated Jan. 4, 2019, 4 pages.
(Continued)

*Primary Examiner* — Joel W Fosselman
(74) *Attorney, Agent, or Firm* — Metis IP LLC

(57) ABSTRACT

A system and a method for processing images are provided. The method may include one or more of the following operations. An image including a plurality of channels and a plurality of pixels may be obtained, each pixel having a pixel value corresponding to one of the plurality of channels. One of the plurality of pixels may be selected as a pixel of interest, and the corresponding channel of the pixel value of the pixel of interest may be designated as a target channel. A plurality of pixels proximate to the pixel of interest may include at least two first reference pixels. For each first reference pixel, a pseudo pixel value for the target channel of the first reference pixel may be determined. Whether the image is a deteriorated image may be determined at least based on the pixel value of the pixel of interest and the determined pseudo pixel values.

20 Claims, 16 Drawing Sheets

(58) Field of Classification Search
USPC .................................................... 348/223.1
See application file for complete search history.

(56) References Cited

U.S. PATENT DOCUMENTS

| | | | |
|---|---|---|---|
| 2005/0219390 A1 | 10/2005 | Tajima et al. | |
| 2008/0247671 A1 | 10/2008 | Yasuma et al. | |
| 2009/0136150 A1 | 5/2009 | Jerdev | |
| 2010/0066868 A1 | 3/2010 | Shohara | |
| 2011/0310275 A1 | 12/2011 | Powell et al. | |
| 2013/0222531 A1 | 8/2013 | Hirai | |
| 2013/0308826 A1* | 11/2013 | Asano | G06T 5/50 382/106 |
| 2014/0063297 A1 | 3/2014 | Yamura | |
| 2014/0125847 A1 | 5/2014 | Yasuda et al. | |
| 2015/0138439 A1 | 5/2015 | Chen et al. | |
| 2015/0215595 A1 | 7/2015 | Yoshida | |
| 2016/0110843 A1 | 4/2016 | Mills et al. | |
| 2017/0070692 A1 | 3/2017 | Lin et al. | |
| 2018/0088588 A1 | 3/2018 | Ion et al. | |

FOREIGN PATENT DOCUMENTS

| | | |
|---|---|---|
| CN | 101588505 A | 11/2009 |
| CN | 101588447 B | 4/2011 |
| CN | 101588505 B | 5/2011 |
| CN | 103747222 A | 4/2014 |
| CN | 105704406 A | 6/2016 |
| CN | 105809644 A | 7/2016 |
| CN | 103369209 B | 8/2016 |
| CN | 103475828 B | 9/2016 |
| CN | 105959512 A | 9/2016 |
| CN | 106303157 A | 1/2017 |
| CN | 106303483 A | 1/2017 |
| CN | 106412385 A | 2/2017 |
| CN | 106412542 A | 2/2017 |
| CN | 106612386 A | 5/2017 |
| CN | 106937064 A | 7/2017 |
| CN | 107016670 A | 8/2017 |
| CN | 107248147 A | 10/2017 |
| CN | 107800980 A | 3/2018 |
| CN | 108124141 A | 6/2018 |
| JP | H02100494 A | 4/1990 |

OTHER PUBLICATIONS

Written Opinion in PCT/CN2018/110341 dated Jan. 4, 2019, 5 pages.
Extended European Search Report in European Application No. 18868765.1 dated Oct. 13, 2020, 10 pages.

* cited by examiner

400

| B00 (Blue) | G01 (Green) | B02 (Blue) | G03 (Green) | B04 (Blue) | G05 (Green) | B06 (Blue) |
|---|---|---|---|---|---|---|
| G10 (Green) | R11 (Red) | G12 (Green) | R13 (Red) | G14 (Green) | R15 (Red) | G16 (Green) |
| B20 (Blue) | G21 (Green) | B22 (Blue) | G23 (Green) | B24 (Blue) | G25 (Green) | B26 (Blue) |
| G30 (Green) | R31 (Red) | G32 (Green) | R33 (Red) | G34 (Green) | R35 (Red) | G36 (Green) |
| B40 (Blue) | G41 (Green) | B42 (Blue) | G43 (Green) | B44 (Blue) | G45 (Green) | B46 (Blue) |
| G50 (Green) | R51 (Red) | G52 (Green) | R53 (Red) | G54 (Green) | R55 (Red) | G56 (Green) |
| B60 (Blue) | G61 (Green) | B62 (Blue) | G63 (Green) | B64 (Blue) | G65 (Green) | B66 (Blue) |

```
┌─────────────────────────────────────────────┐
│ Determining a pixel of interest in an image │
│ and an N*N pixel matrix centered on the     │─── 510
│ pixel of interest, the pixel matrix         │
│ including an inner ring and an outer ring   │
└─────────────────────────────────────────────┘
                      ↓
          No    ◇ Is the pixel of interest    ◇ ─── 520
         ←──────  an edge pixel?
                      ↓ Yes
┌─────────────────────────────────────────────┐
│ Performing a homochromatic pre-correction   │─── 530
│ operation on the N*N pixel matrix           │
└─────────────────────────────────────────────┘
                      ↓
┌─────────────────────────────────────────────┐
│ For each pixel in the inner ring and the    │
│ outer ring, converting the color of the     │─── 540
│ pixel to be the same as the pixel of        │
│ interest, and determining a converted       │
│ pixel value of the pixel                    │
└─────────────────────────────────────────────┘
                      ↓
┌─────────────────────────────────────────────┐
│ Performing a pre-correction operation on    │─── 550
│ the inner ring and the outer ring of the    │
│ N*N pixel matrix                            │
└─────────────────────────────────────────────┘
                      ↓
┌─────────────────────────────────────────────┐
│ Determining the pixel of interest to be a   │
│ dead pixel based on the determined          │─── 560
│ converted pixel values of the pixels, and   │
│ correcting the pixel of interest            │
└─────────────────────────────────────────────┘
                      ↓
┌─────────────────────────────────────────────┐
│ Performing a pre-correction operation on    │─── 570
│ the outer ring of the N*N pixel matrix      │
└─────────────────────────────────────────────┘
                      ↓
┌─────────────────────────────────────────────┐
│ Determining the pixel of interest to be a   │
│ dead pixel based on homochromatic pixels    │─── 580
│ of the pixel of interest in the outer ring, │
│ and correcting the pixel of interest        │
└─────────────────────────────────────────────┘
```

| B00 | G01 | B02 | G03 | B04 | G05 | B06 |
| --- | --- | --- | --- | --- | --- | --- |
| G10 | R11 | G12 | R13 | G14 | R15 | G16 |
| B20 | G21 | B22 | G23 | B24 | G25 | B26 |
| G30 | R31 | G32 | R33 (Center) | G34 | R35 | G36 |
| B40 | G41 | B42 | G43 | B44 | G45 | B46 |
| G50 | R51 | G52 | R53 | G54 | R55 | G56 |
| B60 | G61 | B62 | G63 | B64 | G65 | B66 |

| | | | | | | |
|---|---|---|---|---|---|---|
| | | | | | | |
| | R11 | r12 | R13 | r14 | R15 | |
| | r21 | r22 | r23 | r24 | r25 | |
| | R31 | r32 | R33 (Center) | r34 | R35 | |
| | r41 | r42 | r43 | r44 | r45 | |
| | R51 | r52 | R53 | r54 | R55 | |
| | | | | | | |

1110 — Determining a first pixel, a first region centered on the first pixel, and a second region centered on the first pixel in an image 1120 — For each pixel that satisfy a first condition in the first region, obtaining a difference between a saturation of the pixel and a preset threshold, and determining a first weight factor corresponding to the first region based on a mean of the differences 1130 — Performing a weighted mean operation on U and V channel values for the first pixel and average U and V channel values that correspond to the first region, to obtain false color pre-correction values for the U and V channel values for the first pixel 1140 — Performing a weighted mean operation on U and V channel values for the first pixel and median U and V channel values that correspond to the first region, to obtain false color correction values for the U and V channel values for the first pixel, the median U and V channel values being obtained after a median filtering operation, the median filtering operation being performed at least based on the obtained false color pre-correction values for the U and V channel values for the first pixel 1150 — Performing a color noise suppression operation on the first pixel based on the pixels in the second region, to obtain color-noise-suppressed U and V channel values for the first pixel

FIG. 11A

METHODS AND DEVICES FOR PROCESSING IMAGES

CROSS REFERENCE TO RELATED APPLICATIONS

This application is a continuation of International Application No. PCT/CN2018/110341, filed on Oct. 16, 2018, which claims priority to Chinese Application No. 201710976159.0, filed on Oct. 19, 2017, Chinese Application No. 201711352453.0, filed on Dec. 15, 2017, the entire contents of which are hereby incorporated herein by reference.

TECHNICAL FIELD

The present application typically relates to image processing, and particularly to a method and device for executing a restoration process regarding images.

BACKGROUND

The recognition of color by human eyes is based on the principle that human eyes have three different induction units to light, and different induction units have different response curves to light of different bands. Color perception can be obtained through brain synthesis. Generally speaking, the three primary colors, i.e., red, blue and green, may be used to illustrate the decomposition and synthesis of colors.

In the camera imaging system, due to optical dispersion of lens, horizontal and vertical color differences will be generated. These horizontal and vertical color differences are displayed as pseudo-colors such as purple edge, green edge, yellow edge and blue edge on the edge of the image, resulting in image distortion. Therefore, the pseudo-colors need to be corrected.

SUMMARY

A first aspect of the present disclosure relates to a system for image restoration processing. The system may comprise a storage medium and at least one video processing device. The storage device may store an image acquired by an image sensor. The obtained image may include a plurality of channels and a plurality of pixels. Each pixel may have a pixel value corresponding to one of the plurality of channels. During operation, the at least one video processing device may be configured to perform one or more of the following operations. The at least one video processing device may select one of the plurality of pixels as a pixel of interest, designate the corresponding channel of the pixel value of the pixel of interest as a target channel, and select a plurality of pixels proximate to the pixel of interest. The plurality of pixels proximate to the pixel of interest may include at least two first reference pixels. The first reference pixels may have pixel values corresponding to a same first reference channel different from the target channel. The at least one video processing device may, for each first reference pixel, determine a pseudo pixel value for the target channel of the first reference pixel. The at least one video processing device may, determine that the pixel of interest is deteriorated at least based on the pixel value of the pixel of interest, and the determined pixel values of the first reference pixels for the target channel. The at least one video processing device may, create, upon a determination that the pixel of interest may be deteriorated, a restored image.

In some embodiments, the at least one video processing device may be configured to perform one or more of the following operations. The at least one video processing device may select at least two second reference pixels within the plurality of pixels proximate to the pixel of interest, each second reference pixel having a pixel value corresponding to the target channel. The at least one video processing device may determine that the pixel of interest may be deteriorated at least based on the pixel value of the pixel of interest, the determined pseudo pixel values for the target channel of the first reference pixels, and the pixel values of the second reference pixels.

In some embodiments, the at least one video processing device may be configured to perform one or more of the following operations. The at least one video processing device may select at least two third reference pixels within the plurality of pixels proximate to the pixel of interest, wherein the third reference pixels have pixel values corresponding to a same second reference channel different from the target channel and the first reference channel. The at least one video processing device may, for each third reference pixel, determine a pseudo pixel value for the target channel of the third reference pixel. The at least one video processing device may determine that the pixel of interest may be deteriorated based on the pixel value of the pixel of interest, the determined pseudo pixel values for the target channel of the first reference pixels, the pixel values of the second reference pixels, and the determined pseudo pixel values for the target channel of the third reference pixels.

In some embodiments, the at least one video processing device may be configured to perform one or more of the following operations. The at least one video processing device may determine a maximum pixel value among the determined pseudo pixel values for the target channel of the first reference pixels, the pixel values of the second reference pixels, and the determined pseudo pixel values for the target channel of the third reference pixels. The at least one video processing device may determine a difference between the pixel value of the pixel of interest and the maximum pixel value. The at least one video processing device may determine that the pixel of interest may be deteriorated at least based on that the pixel value of the pixel of interest may be larger than the maximum pixel value, and that the difference between the pixel value of the pixel of interest and the maximum pixel value exceeds a threshold.

In some embodiments, the at least one video processing device may be configured to perform one or more of the following operations. The at least one video processing device may determine a minimum pixel value among the determined pseudo pixel values for the target channel of the first reference pixels, the pixel values of the second reference pixels, and the determined pseudo pixel values for the target channel of the third reference pixels. The at least one video processing device may determine a difference between the pixel value of the pixel of interest and the minimum pixel value. The at least one video processing device may determine that the pixel of interest may be deteriorated at least based on that the pixel value of the pixel of interest may be smaller than the minimum pixel value, and that the difference between the pixel value of the pixel of interest and the minimum pixel value exceeds a threshold.

In some embodiments, the pixel of interest and the plurality of pixels proximate to the pixel of interest are in a region. The at least one video processing device may be configured to perform one or more of the following operations.

The at least one video processing device may determine a color difference corresponding to the region. The at least one video processing device may for each first reference pixel in the region, determine the pseudo pixel value for the target channel of the first reference pixel based on the pixel value of the first reference pixel and the color difference corresponding to the region.

In some embodiments, the at least one video processing device may be configured to perform one or more of the following operations. The at least one video processing device may, for each pixel in the region, determine a color difference value corresponding to the pixel. The at least one video processing device may determine a mean of the color difference values corresponding to the pixels in the region as the color difference corresponding to the region.

In some embodiments, the at least one video processing device may be configured to perform one or more of the following operations. The at least one video processing device may, for one first reference pixel, select at least two pixels corresponding to the target channel and adjacent to the first reference pixel. The at least one video processing device may determine a mean of the pixel values of the selected pixels. The at least one video processing device may determine a difference between the pixel value of the first reference pixel and the determined mean as the color difference corresponding to the first reference pixel.

In some embodiments, the at least one video processing device may be configured to correct the pixel value of the pixel of interest at least based on the determined pseudo pixel values for the target channel of the first reference pixels.

In some embodiments, the at least one video processing device may be configured to perform one or more of the following operations. The at least one video processing device may select a second reference pixel pair adjacent to the pixel of interest and a first reference pixel pair adjacent to the pixel of interest in the first reference pixels. The at least one video processing device may determine a first difference between pseudo pixel values for the target channel of the two pixels in the second reference pixel pair. The at least one video processing device may determine a second difference between pseudo pixel values for the target channel of the two pixels in the first reference pixel pair. The at least one video processing device may, upon determining that the first difference may be smaller than the second difference, correct the pixel value of the pixel of interest as one of the pseudo pixel values for the target channel of the two pixels of the first reference pixel pair.

In some embodiments, the pixel of interest and the plurality of pixels are in a region centered on the pixel of interest.

A second respect of the present disclosure relates to a method implemented on at least one machine each of which has at least one processor and at least one storage device. The method may comprise one or more of the following operations.

The method may comprise storing an image acquired by an image sensor, the obtained image including a plurality of channels and a plurality of pixels, each pixel having a pixel value corresponding to one of the plurality of channels. The method may comprise: selecting one of the plurality of pixels as a pixel of interest. The method may comprise: designating the corresponding channel of the pixel value of the pixel of interest as a target channel. The method may comprise: selecting a plurality of pixels proximate to the pixel of interest, wherein the plurality of pixels proximate to the pixel of interest include at least two first reference pixels, wherein the first reference pixels have pixel values corresponding to a same first reference channel different from the target channel. The method may comprise: for each first reference pixel, determining a pseudo pixel value for the target channel of the first reference pixel. The method may comprise: determining that the pixel of interest may be deteriorated at least based on the pixel value of the pixel of interest, and the determined pixel values of the first reference pixels for the target channel. The method may comprise: creating, upon a determination that the pixel of interest may be deteriorated, a restored image.

In some embodiments, the method may further comprise one or more of the following operations. The method may comprise: selecting at least two second reference pixels within the plurality of pixels proximate to the pixel of interest, each second reference pixel having a pixel value corresponding to the target channel. The method may comprise: determining that the pixel of interest may be deteriorated at least based on the pixel value of the pixel of interest, the determined pseudo pixel values for the target channel of the first reference pixels, and the pixel values of the second reference pixels.

In some embodiments, the method may comprise one or more of the following operations. The method may comprise: selecting at least two third reference pixels within the plurality of pixels proximate to the pixel of interest, wherein the third reference pixels have pixel values corresponding to a same second reference channel different from the target channel and the first reference channel. The method may comprise: for each third reference pixel, determine a pseudo pixel value for the target channel of the third reference pixel. The method may comprise: determining that the pixel of interest may be deteriorated based on the pixel value of the pixel of interest, the determined pseudo pixel values for the target channel of the first reference pixels, the pixel values of the second reference pixels, and the determined pseudo pixel values for the target channel of the third reference pixels.

In some embodiments, the method may comprise one or more of the following operations. The method may comprise: determining a maximum pixel value among the determined pseudo pixel values for the target channel of the first reference pixels, the pixel values of the second reference pixels, and the determined pseudo pixel values for the target channel of the third reference pixels. The method may comprise: determining a difference between the pixel value of the pixel of interest and the maximum pixel value. The method may comprise: determining that the pixel of interest may be deteriorated at least based on that the pixel value of the pixel of interest may be larger than the maximum pixel value, and that the difference between the pixel value of the pixel of interest and the maximum pixel value exceeds a threshold.

In some embodiments, the method may comprise one or more of the following operations. The method may comprise: determining a minimum pixel value among the determined pseudo pixel values for the target channel of the first reference pixels, the pixel values of the second reference pixels, and the determined pseudo pixel values for the target channel of the third reference pixels. The method may comprise: determining a difference between the pixel value of the pixel of interest and the minimum pixel value. The method may comprise: determining that the pixel of interest may be deteriorated at least based on that the pixel value of the pixel of interest may be smaller than the minimum pixel value, and that the difference between the pixel value of the pixel of interest and the minimum pixel value exceeds a threshold.

In some embodiments, the method may comprise one or more of the following operations. The method may comprise: determining a color difference corresponding to the region. The method may comprise: for each first reference pixel in the region, determining the pseudo pixel value for the target channel of the first reference pixel based on the pixel value of the first reference pixel and the color difference corresponding to the region.

In some embodiments, the method may comprise one or more of the following operations. The method may comprise: for each pixel in the region, determining a color difference value corresponding to the pixel. The method may comprise: determining a mean of the color difference values corresponding to the pixels in the region as the color difference corresponding to the region.

In some embodiments, the method may comprise one or more of the following operations. The method may comprise: for one first reference pixel, selecting at least two pixels corresponding to the target channel and adjacent to the first reference pixel. The method may comprise: determining a mean of the pixel values of the selected pixels. The method may comprise: determining a difference between the pixel value of the first reference pixel and the determined mean as the color difference corresponding to the first reference pixel.

In some embodiments, the method may comprise one or more of the following operations. The method may comprise: correcting the pixel value of the pixel of interest at least based on the determined pseudo pixel values for the target channel of the first reference pixels.

In some embodiments, the method may comprise one or more of the following operations. The method may comprise: selecting a second reference pixel pair adjacent to the pixel of interest and a first reference pixel pair adjacent to the pixel of interest in the first reference pixels. The method may comprise: determining a first difference between pseudo pixel values for the target channel of the two pixels in the second reference pixel pair. The method may comprise: determining a second difference between pseudo pixel values for the target channel of the two pixels in the first reference pixel pair. The method may comprise: upon determining that the first difference may be smaller than the second difference, correcting the pixel value of the pixel of interest as one of the pseudo pixel values for the target channel of the two pixels of the first reference pixel pair.

In some embodiments, the pixel of interest and the plurality of pixels are in a region centered on the pixel of interest.

A third aspect of the present disclosure relates to a non-transitory computer readable medium including executable instructions that, when executed by at least one processor, cause the at least one processor to effectuate a method comprising one or more of the following operations. The method may comprise: storing an image acquired by an image sensor, the obtained image including a plurality of channels and a plurality of pixels, each pixel having a pixel value corresponding to one of the plurality of channels. The method may comprise: selecting one of the plurality of pixels as a pixel of interest. The method may comprise: designating the corresponding channel of the pixel value of the pixel of interest as a target channel. The method may comprise: selecting a plurality of pixels proximate to the pixel of interest, wherein the plurality of pixels proximate to the pixel of interest include at least two first reference pixels, wherein the first reference pixels have pixel values corresponding to a same first reference channel different from the target channel. The method may comprise: for each first reference pixel, determining a pseudo pixel value for the target channel of the first reference pixel. The method may comprise: determining that the pixel of interest may be deteriorated at least based on the pixel value of the pixel of interest, and the determined pixel values of the first reference pixels for the target channel. The method may comprise: creating, upon a determination that the pixel of interest may be deteriorated, a restored image.

A fourth aspect of the present disclosure related to a system for processing images, comprising at least one video processing device, wherein during operation, the at least one video processing device may be configured to perform one or more of the following operations. The at least one video processing device may obtain an image including a plurality of pixels. The at least one video processing device may select one of the plurality of pixels as a pixel of interest. The at least one video processing device may select a first region and a second region according to the pixel of interest. The at least one video processing device may perform a false color correction operation on the pixel of interest based on at least some of a plurality of pixels in the first region to determine a first correction value for the pixel of interest, the first correction value being relating to the false color in the pixel of interest. The at least one video processing device may perform a color noise suppression operation on the pixel of interest based on at least some of a plurality of pixels in the second region to determine a second correction value for the pixel of interest, the second correction value being relating to the color noise in the pixel of interest. The at least one video processing device may determine a target correction value for the pixel of interest at least based on the determined first correction value and the second correction value. The at least one video processing device may correct the pixel of interest based on the determined target correction value.

In some embodiments, the at least one video processing device may further be configured to perform one or more of the following operations. The at least one video processing device may generate a corrected image at least based on the corrected pixel of interest. The at least one video processing device may display the corrected image on a display.

In some embodiments, the at least one video processing device may be configured to perform one or more of the following operations. The at least one video processing device may obtain a second weight factor for the second correction value. The at least one video processing device may determine a third weight factor for the first correction value based on the second weight factor. The at least one video processing device may determine the target correction value as a first weighted mean that may be determined based on the second weight factor, the second correction value, the third weight factor, and the first correction value.

In some embodiments, to determine a first correction value for the pixel of interest, the at least one video processing device may be configured to perform one or more of the following operations. The at least one video processing device may obtain a first weight factor for a value of a chrominance channel for the pixel of interest. The at least one video processing device may perform a median filtering operation on the pixel of interest to determine a median value corresponding to the first region. The at least one video processing device may determine a fourth weight factor for the median value based on the first weight factor. The at least one video processing device may determine the first correction value for the pixel of interest as a second weighted mean that may be determined based on the first weight factor, the value of chrominance channel for the pixel of interest, the fourth weight factor, and the determined median value corresponding to the first region.

In some embodiments, to determine the median value corresponding to the first region, the at least one video processing device may be configured to perform one or more of the following operations. The at least one video processing device may determine a value of a chrominance channel for the first region. The at least one video processing device may determine a third weighted mean based on the first weight factor, the value of the chrominance channel for the pixel of interest, the fourth factor, and the value of the chrominance channel for the first region, the fourth weight factor corresponding to the value of the chrominance channel for the first region. The at least one video processing device may perform the median filtering operation on the pixel of interest based on the value of the chrominance channel for the pixel of interest and the third weighted mean.

In some embodiments, the first region may include a plurality of pixels, and wherein to determine the value of the chrominance channel for the first region, the at least one video processing device may be configured to perform one or more of the following operations. The at least one video processing device may, for each pixel in the first region, determine a value of a chrominance channel for the pixel. The at least one video processing device may, determine a mean of the determined values of the chrominance channels for the pixels to be the value of the chrominance channel for the first region.

In some embodiments, the first region may include a plurality of pixels. In some embodiments, to obtain the first weight factor, the at least one video processing device may be configured to perform one or more of the following operations. The at least one video processing device may for each of at least some of the pixels in the first region, determine a difference between a value of a chrominance channel for the pixel and a threshold. The at least one video processing device may determine a mean of the determined differences to be the first weight factor.

In some embodiments, the first region and the second region may be centered on the pixel of interest.

In some embodiments, the second region may be larger than the first region.

A fifth aspect of the present disclosure relates to a method implemented on at least one machine each of which has at least one processor and at least one storage device, the method comprising one or more of the following operations. The method may include: obtaining an image including a plurality of pixels. The method may include: selecting one of the plurality of pixels as a pixel of interest. The method may include: selecting a first region and a second region according to the pixel of interest. The method may include: performing a false color correction operation on the pixel of interest based on at least some of a plurality of pixels in the first region to determine a first correction value for the pixel of interest, the first correction value being relating to the false color in the pixel of interest. The method may include: performing a color noise suppression operation on the pixel of interest based on at least some of a plurality of pixels in the second region to determine a second correction value for the pixel of interest, the second correction value being relating to the color noise in the pixel of interest. The method may include: determining a target correction value for the pixel of interest at least based on the determined first correction value and the second correction value. The method may include: correcting the pixel of interest based on the determined target correction value.

In some embodiments, the method may further comprise one or more of the following operations. The method may include: generating a corrected image at least based on the corrected pixel of interest. The method may include: displaying the corrected image on a display.

In some embodiments, the method may comprise one or more of the following operations. The method may comprise obtaining a second weight factor for the second correction value. The method may comprise determining a third weight factor for the first correction value based on the second weight factor. The method may comprise determining the target correction value as a first weighted mean that is determined based on the second weight factor, the second correction value, the third weight factor, and the first correction value.

The method may comprise one or more of the following operations. The method may comprise obtaining a first weight factor for a value of a chrominance channel for the pixel of interest. The method may comprise performing a median filtering operation on the pixel of interest to determine a median value corresponding to the first region.

The method may comprise determining a fourth weight factor for the median value based on the first weight factor. The method may comprise determining the first correction value for the pixel of interest as a second weighted mean that is determined based on the first weight factor, the value of chrominance channel for the pixel of interest, the fourth weight factor, and the determined median value corresponding to the first region.

The method may comprise determining a value of a chrominance channel for the first region. The method may comprise determining a third weighted mean based on the first weight factor, the value of the chrominance channel for the pixel of interest, the fourth factor, and the value of the chrominance channel for the first region, the fourth weight factor corresponding to the value of the chrominance channel for the first region. The method may comprise performing the median filtering operation on the pixel of interest based on the value of the chrominance channel for the pixel of interest and the third weighted mean.

In some embodiments, the first region includes a plurality of pixels, and the method may comprise one or more of the following operations. The method may comprise, for each pixel in the first region, determining a value of a chrominance channel for the pixel. The method may include, determining a mean of the determined values of the chrominance channels for the pixels to be the value of the chrominance channel for the first region.

In some embodiments, the first region includes a plurality of pixels, and the method may comprise one or more of the following operations. The method may comprise one or more of the following operations. The method may include, for each of at least some of the pixels in the first region, determining a difference between a value of a chrominance channel for the pixel and a threshold. The method may comprise determining a mean of the determined differences to be the first weight factor.

In some embodiments, the first region and the second region is centered on the pixel of interest.

In some embodiments, the second region is larger than the first region.

A sixth aspect of the present disclosures relates to a non-transitory computer readable medium including executable instructions that, when executed by at least one processor, cause the at least one processor to effectuate a method comprising one or more of the following operations. The method may comprise obtaining an image including a plurality of pixels. The method may comprise selecting one of the plurality of pixels as a pixel of interest. The method may comprise selecting a first region and a second region according to the pixel of interest. The method may comprise performing a false color correction operation on the pixel of interest based on at least some of a plurality of pixels in the first region to determine a first correction value for the pixel of interest, the first correction value being relating to the false color in the pixel of interest. The method may comprise performing a color noise suppression operation on the pixel of interest based on at least some of a plurality of pixels in the second region to determine a second correction value for the pixel of interest, the second correction value being relating to the color noise in the pixel of interest. The method may comprise determining a target correction value for the pixel of interest at least based on the determined first correction value and the second correction value. The method may comprise correcting the pixel of interest based on the determined target correction value.

BRIEF DESCRIPTIONS OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 4 is a schematic diagram illustrating an exemplary Bayer image according to some embodiments of the present disclosure;

FIG. 5 is a flowchart illustrating an exemplary process and/or method for correcting a dead pixel according to some embodiments of the present disclosure;

FIG. 6 is a schematic diagram illustrating an exemplary pixel matrix according to some embodiments of the present disclosure;

FIG. 8 is a schematic diagram illustrating an exemplary sub-block of the pixel matrix in FIG. 6 according to some embodiments of the present disclosure;

FIG. 11A is a flowchart illustrating an exemplary process and/or method for correcting false color according to some embodiments of the present disclosure;

DETAILED DESCRIPTION

Figure 1:
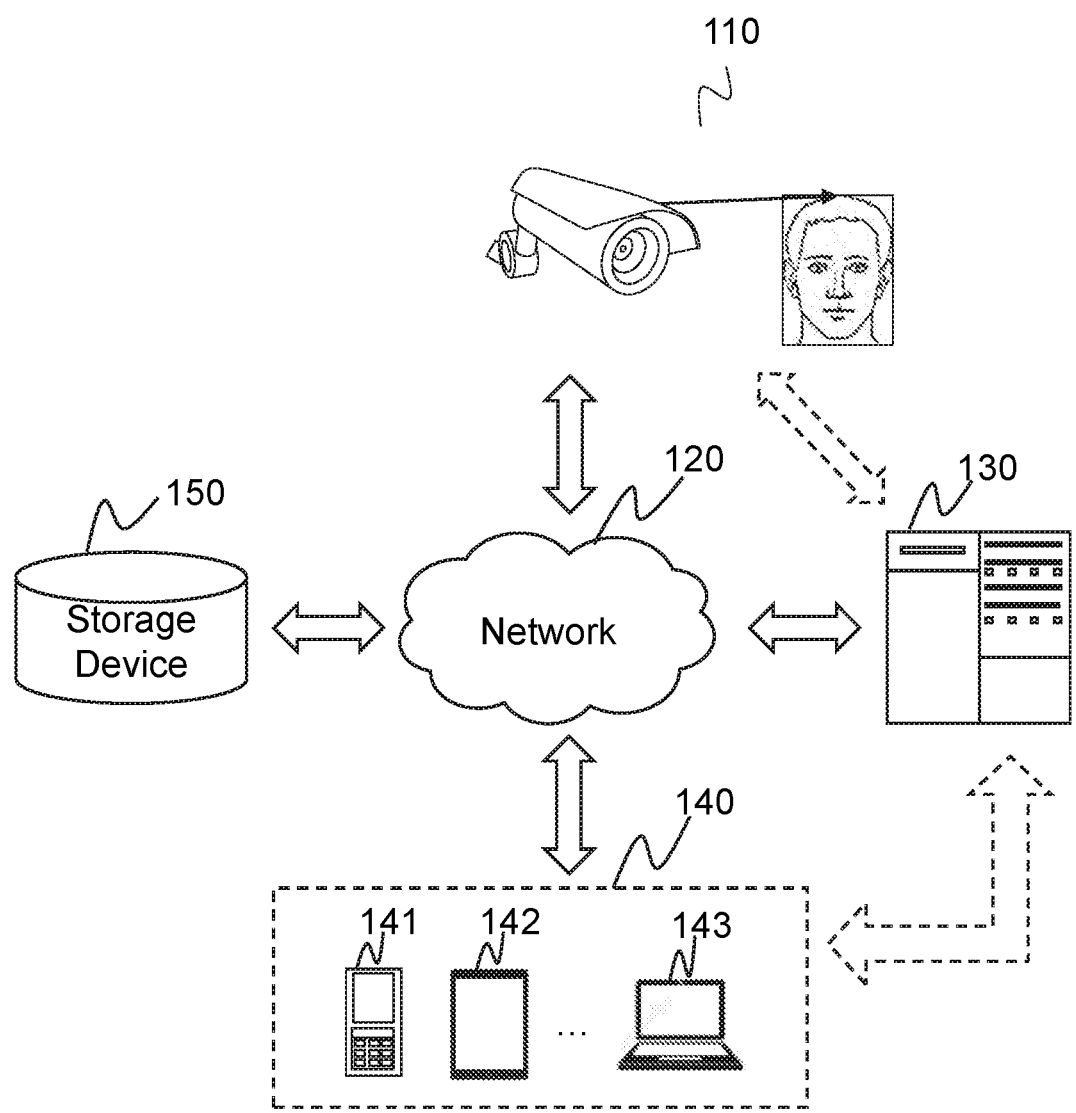
FIG. 1 is a block diagram of an exemplary image processing system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a", "an", and "the" may be intended to include the plural forms as well, unless the context clearly indicates otherwise. It will be further understood that the terms "comprise", "comprises", and/or "comprising", "include", "includes", and/or "including", when used in this specification, specify the presence of stated features, integers, steps, operations, elements, and/or components, but do not preclude the presence or addition of one or more other features, integers, steps, operations, elements, components, and/or groups thereof.

It will be understood that the term "system," "unit," "module," and/or "block" used herein are one method to distinguish different components, elements, parts, section or assembly of different level in ascending order. However, the terms may be displaced by another expression if they achieve the same purpose.

The modules (or units, blocks, units) described in the present disclosure may be implemented as software and/or hardware modules and may be stored in any type of non-transitory computer-readable medium or other storage device. In some embodiments, a software module may be compiled and linked into an executable program. It will be appreciated that software modules can be callable from other modules or from themselves, and/or can be invoked in response to detected events or interrupts. Software modules configured for execution on computing devices can be provided on a computer readable medium, such as a compact disc, a digital video disc, a flash drive, a magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in a firmware, such as an EPROM. It will be further appreciated that hardware modules (e.g., circuits) can be included of connected or coupled logic units, such as gates and flip-flops, and/or can be included of programmable units, such as programmable gate arrays or processors. The modules or computing device functionality described herein are preferably implemented as hardware modules, but can be software modules as well. In general, the modules described herein refer to logical modules that can be combined with other modules or divided into units despite their physical organization or storage.

Generally, the word "module," "sub-module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts.

Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure.

An aspect of the present disclosure relates to restoring an image including an abnormal pixel (e.g., a deteriorated pixel, a pixel including false color, or a pixel including color noise, etc.). For example, an aspect of the present disclosure is to determine whether a pixel of interest is a deteriorated pixel based on original color information of pixels having the same color as the pixel of interest, which improves the accuracy of the determination result. As another example, an aspect of the present disclosure is to determine a correction value for the pixel of interest by performing false color correction operation and color noise suppression operation on the pixel of interest, which results in a relatively accurate determination result. The false color correction operation may be performed based on a region having a size smaller than that of the region based on which the color noise suppression operation is performed, which improves the efficiency of the determination of the correction value.

FIG. 1 is a block diagram of an exemplary image processing system 100 according to some embodiments of the present disclosure. The image processing system 100 may be configured for processing an image by, for example, determining whether an abnormal pixel exists in the image. Exemplary abnormal pixels may include deteriorated pixels, pixels including false color, or pixels including color noise.

As illustrated in FIG. 1, the image processing system may include a sensor 110, a network 120, a processor 130 (also referred to as a processing device), a terminal 140, and a storage device 150. The components of the image processing system 100 may be connected to each other in one or more of various ways. Merely by way of example, the sensor 110 may be connected to the processor 130 via the network 120. As another example, the sensor 110 may be connected to the processor 130 directly. As a further example, the storage device 150 may be connected to the processor 130 directly or via the network 120. As still a further example, the terminal 140 may be connected to the processor 130 directly or via the network 120.

The sensor 110 may be configured to capture one or more images. As used in this application, an image may be a still image, a video, a stream video, or a video frame obtained from a video. The image may be a three-dimensional (3D) image or a two-dimensional (2D) image. The sensor 110 may be or may include a camera. In some embodiments, the sensor 110 may be a digital camera, a video camera, a security camera, a web camera, a smartphone, a tablet, a laptop, a video gaming console equipped with a web camera, a camera with multiple lenses, a camcorder, etc. In some embodiments, the sensor 110 may be covered with a color filter array (CFA) to generate images. For example, the sensor 110 may be covered with a Bayer filter, and accordingly generate a Bayer image.

As used elsewhere in the present disclosure, the term "Bayer image" may be an image collected by an image sensor with a Bayer filter. The Bayer filter may be a color filter array (CFA) covering the image sensor. Each pixel in a Bayer image may only have information (e.g., pixel value) that corresponds to one color (or referred to as color channel, or simply referred to as channel). Exemplary colors may include red, green, and/or blue. For example, as shown in FIG. 4, a Bayer image 400 may include a plurality of pixels. Each pixel may correspond to a color. For example, pixels with labels including "B" (e.g., pixels B00, B02, or B20, etc.) may correspond to the color of blue. Pixels with labels including "G" (e.g., pixels G01, G03, G05, etc.) may correspond to the color of green. Pixels with labels including "R" (e.g., pixels R11, R13, R15, etc.) may correspond to the color of red. In some embodiments, pixels corresponding to the same color may be arranged at intervals of 1 row or 1 column. For example, pixel B00 locates at row 1, column 1, and the nearest pixels corresponding to the same color (i.e., B02 and pixel B20) may respectively locate at row 1, column 3, and row 3, column 1.

The generated Bayer image may include a plurality of pixels, each pixel having a pixel value corresponding to a channel, for example, a G channel, an R channel, or a B channel. The plurality of pixels in the Bayer image may include a pixel of interest and a plurality of reference pixels for the pixel of interest. Any pixel in the Bayer image may be selected as the pixel of interest in the Bayer image. Reference pixels of a pixel of interest may refer to pixels providing information for processing the pixel of interest. For example, a pixel of interest may be determined to be a deteriorated pixel or not, based on the reference pixels of the pixel of interest. As another example, when the pixel of interest is determined to be a deteriorated pixel, the pixel of interest may be corrected at least based on the reference pixels. In some embodiments, the reference pixels for a pixel of interest may include pixels proximate to the pixel of interest. In some embodiments, some of the reference pixels may correspond to the same color as the pixel of interest, and others may correspond to one or more colors different from that of the pixel of interest. For example, the pixel of interest may correspond to a target channel, a first group of reference pixels may correspond to a first reference channel different from the target channel, a second group of reference pixels may correspond to the target channel, and a third group of reference pixels may correspond to a second reference channel different from the target channel and the first reference channel. As used herein, pixels in the first group of reference pixels, pixels in the second group of reference pixels, and pixels in the third group of reference pixels may also be referred to as first reference pixels, second reference pixels, and third reference pixels, respectively.

The network 120 may facilitate exchange of information and/or data. In some embodiments, one or more components of the image processing system 100 (e.g., the sensor 110, the terminal 140, the processor 130, or the storage device 150) may send information and/or data to another component(s) in the image processing system 100 via the network 120. For example, the processor 130 may process an image obtained from the sensor 110 via the network 120. As another example, the processor 130 may obtain user instructions from the terminal 140 via the network 120. In some embodiments, the network 120 may be any type of wired or wireless network, or combination thereof. The network 120 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 120 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired or wireless network access points such as base stations and/or internet exchange points through which one or more components of the image processing system 100 may be connected to the network 120 to exchange data and/or information.

In some embodiments, the processor 130 may process data obtained from the sensor 110, the terminal 140, or the storage device 150. The processor 130 may be a central processing unit (CPU), a digital signal processor (DSP), a system on a chip (SoC), a microcontroller unit (MCU), or the like, or any combination thereof. In some embodiments, the processor 130 may be a single server or a server group. The server group may be centralized or distributed. In some embodiments, the processor 130 may be local to or remote from the image processing system 100. For example, the processor 130 may access information and/or data stored in the sensor 110, the terminal 140, and/or the storage device 150 via the network 120. As another example, the processor 130 may be directly connected to the sensor 110, the terminal 140, and/or the storage device 150, to access stored information and/or data. In some embodiments, the processor 130 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the processor 130 may be configured to process images. In some embodiments, the processor 130 obtain a Bayer image from the sensor 110, and determine whether an abnormal pixel exists in the Bayer image. For example, the processor 130 may determine whether a deteriorated pixel (or referred to as a dead pixel) exists in the Bayer image. In some embodiments, the processor 130 may correct the abnormal pixel in the Bayer image to generate a restored image. For example, the processor 130 may correct the dead pixels in the Bayer image. As another example, the processor 130 may correct the pixels having false color and color noise in the Bayer image.

In some embodiments, to determine whether a pixel of interest in the Bayer image is deteriorated, the processor 130 may, for each first reference pixel (and/or third reference pixel), determine a pseudo pixel value for the target channel of the pixel of interest, and determine whether the pixel of interest is deteriorated at least based on the pixel value of the pixel of interest, the pixel values of the second reference pixels, and/or the determined pseudo pixel values for the target channel of the first reference pixels (and/or pseudo pixel values for the target channel of the third reference pixel).

In some embodiments, to correct the pixel of interest, the processor 130 may select a second reference pixel pair adjacent to the pixel of interest and a first reference pixel pair adjacent to the pixel of interest in the first reference pixels (or in the second reference pixels, or in the third reference pixels), determine a first difference between pseudo pixel values for the target channel of the two pixels in the second reference pixel pair, and determine a second difference between pseudo pixel values for the target channel of the two pixels in the first reference pixel pair. Upon determining that the first difference is smaller than the second difference, the processor 130 may correct the pixel value of the pixel of interest as one of the pseudo pixel values for the target channel of the two pixels of the first reference pixel pair.

In some embodiments, to correct a pixel of interest having false color and color noise in the Bayer image. The processor 130 may determine a target correction value to be directly used to correct the pixel of interest. In some embodiments, to determine the target correction value, the processor 130 may select a first region and a second region according to the pixel of interest, perform a false color correction operation on the pixel of interest based on at least some of a plurality of pixels in the first region to determine a first correction value for the pixel of interest, and perform a color noise suppression operation on the pixel of interest based on at least some of a plurality of pixels in the second region to determine a second correction value for the pixel of interest. The first correction value may be related to the false color in the pixel of interest, and the second correction value may be related to the color noise in the pixel of interest. The processor 130 may determine the target correction value for the pixel of interest at least based on the determined first correction value and the second correction value.

In some embodiments, after correcting the pixel of interest, the processor 130 may further generate a corrected image at least based on the corrected pixel of interest, and display the corrected image on a display. For example, the processor 130 may send the corrected image to the terminal 140 which may display the corrected image on a screen thereof.

The terminal 140 may include a mobile device 141, a tablet computer 142, a laptop computer 143, or the like, or any combination thereof. In some embodiments, the mobile device 1411 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footgear, eyeglasses, a helmet, a watch, clothing, a backpack, an accessory, or the like, or any combination thereof. In some embodiments, the smart mobile device may include a smartphone, a personal digital assistant (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a HoloLens, a Gear VR, etc. In some embodiments, the terminal 140 may remotely operate the sensor 110. In some embodiments, the terminal 140 may operate the sensor 110 via a wireless connection. In some embodiments, the terminal 140 may receive information and/or instructions inputted by a user, and send the received information and/or instructions to the sensor 110 or to the processor 130 via the network 120. In some embodiments, the terminal 140 may receive data and/or information from the processor 130. In some embodiments, the terminal 140 may display received information on a display thereof. In some embodiments, the terminal 140 may be part of the processor 130. In some embodiments, the terminal 140 may be omitted.

The storage device 150 may store data and/or instructions. In some embodiments, the storage device 150 may store data obtained from the terminal 140 and/or the processor 130. In some embodiments, the storage device 150 may store data and/or instructions that the processor 130 may execute or use to perform exemplary methods described in the present disclosure. In some embodiments, the storage device 150 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components of the image processing system 100 (e.g., the terminal 140, the processor 130). One or more components of the image processing system 100 may access the data or instructions stored in the storage device 150 via the network 120. In some embodiments, the storage device 150 may be directly connected to or communicate with one or more components of the image processing system 100 (e.g., the terminal 140, the processor 130). In some embodiments, the storage device 150 may be part of the processor 130.

Figure 2:
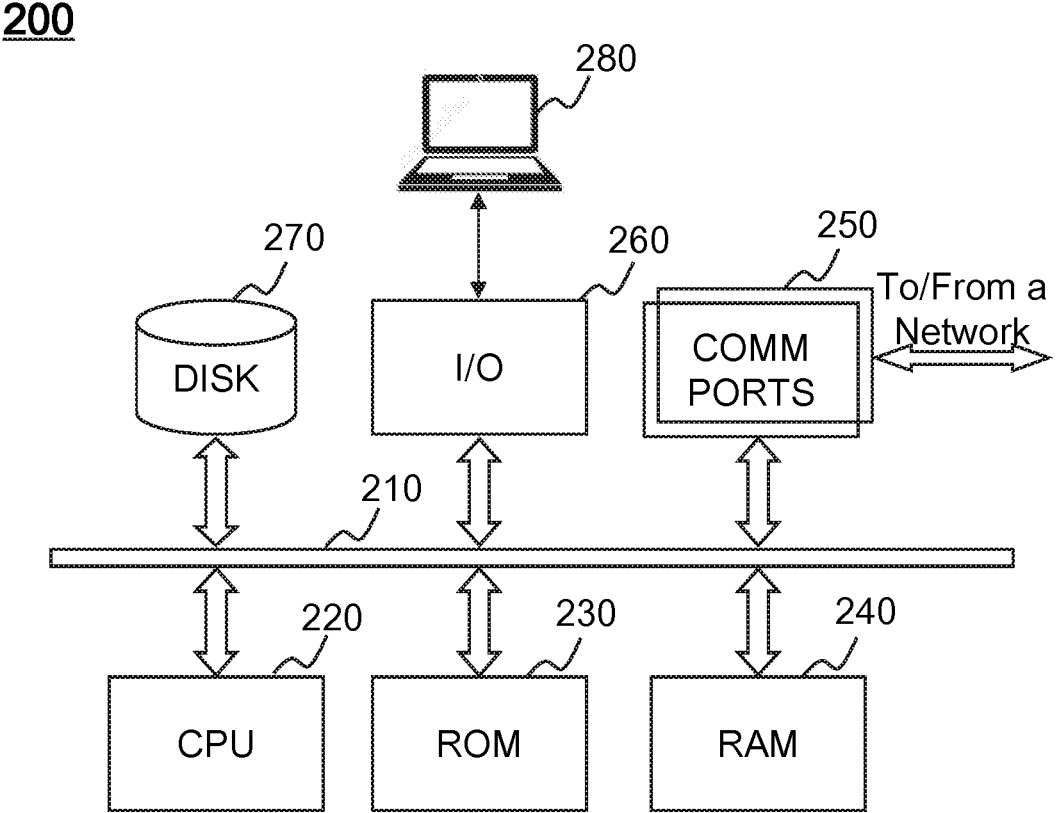
FIG. 2 is a schematic diagram illustrating exemplary hardware and software components of a computing device on which the image processing system or a portion thereof may be implemented according to some embodiments of the present disclosure.

FIG. 2 is a schematic diagram illustrating exemplary hardware and software components of a computing device on which the image processing system 100 or a portion thereof may be implemented according to some embodiments of the present disclosure. In some embodiments, the processor 130 may be implemented on the computing device illustrated in FIG. 2. The processor 130 may be implemented on the computing device via its hardware, software program, firmware, or any combination thereof. Although only one such computing device is shown, for convenience, the functions of the processor 130 described in the present disclosure may be implemented in a distributed fashion on a number of similar platforms, to distribute the processing load. The processor 130 may include, among other things, an internal communication bus 210, a processor 220 (or a CPU), a program storage and data storage of different forms (e.g., a disk 270, a read only memory (ROM) 230, or a random access memory (RAM) 240), for various data files to be processed and/or communicated by the computer, as well as possibly program instructions to be executed by the processor 220. Aspects of the methods of the image processing and/or other processes, as outlined herein, may be embodied in programming. Program aspects of the technology may be thought of as "products" or "articles of manufacture" typically in the form of executable code and/or associated data that is carried on or embodied in a type of machine readable medium. Tangible non-transitory "storage" type media may include any or all of the memory or other storage for the computers, processors, or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a mammography system into the hardware platform(s) of a computing environment or other system implementing a computing environment or similar functionalities in connection with the image processing. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

A computer-readable medium may take many forms including, for example, a tangible storage medium, a carrier wave medium, or physical transmission medium. Non-volatile storage media include, for example, optical or magnetic disks, such as any of the storage devices in any computer(s) or the like, which may be used to implement the system or any of its components as shown in the drawings. Volatile storage media may include dynamic memory, such as a main memory of such a computer platform. Tangible transmission media may include coaxial cables; copper wire and fiber optics, including the wires that form a bus within a computer system. Carrier-wave transmission media may take the form of electric or electromagnetic signal, or acoustic or light waves such as those generated during radio frequency (RF) and infrared (IR) data communications. Common forms of computer-readable media therefore may include for example: a floppy disk, a flexible disk, a hard disk, a magnetic tape, any other magnetic medium, a CD-ROM, a DVD or DVD-ROM, any other optical medium, punch cards paper tape, any other physical storage medium with patterns of holes, a RAM, a PROM or an EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

The processor 220 may execute program instructions stored in a storage device (e.g., the disk 270, the ROM 230, the RAM 240) to perform one or more functions of the processor 130 described in the present disclosure. The processor 220 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a microcontroller unit, an advanced RISC machines processor (ARM), or the like, or a combinations thereof.

An I/O 260 may input and/or output signals, data, information, etc. In some embodiments, the I/O 260 may enable a user interaction with the processor 130. In some embodiments, the I/O 260 may an include input/output device 280.

In some embodiments, the I/O 260 may communicate with the input//output device 280. Examples of the input/output device may include a keyboard, a mouse, a touch screen, a microphone, a display device, a loudspeaker, a printer, a projector, or the like, or any combination thereof. Examples of the display device may include a liquid crystal display (LCD), a light-emitting diode (LED)-based display, a flat panel display, a curved screen, a television device, a cathode ray tube (CRT), a touch screen, or the like, or any combination thereof.

The communication port 250 may be connected to a network (e.g., the network 120) to facilitate data communications. The communication port 250 may establish connections between other components in the image processing system 100. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or any combination thereof. In some embodiments, the communication port 250 may be and/or include a standardized communication port, such as RS232, RS485, etc. In some embodiments, the communication port 250 may be a specially designed communication port. For example, the communication port 250 may be designed in accordance with the digital imaging and communications in medicine (DICOM) protocol.

Those skilled in the art will recognize that the present teachings are amenable to a variety of modifications and/or enhancements. For example, although the implementation of various components described herein may be embodied in a hardware device, it may also be implemented as a software only solution, for example, an installation on an existing server. In addition, the processor 130 as disclosed herein may be implemented as a firmware, firmware/software combination, firmware/hardware combination, or a hardware/firmware/software combination.

Figure 3:
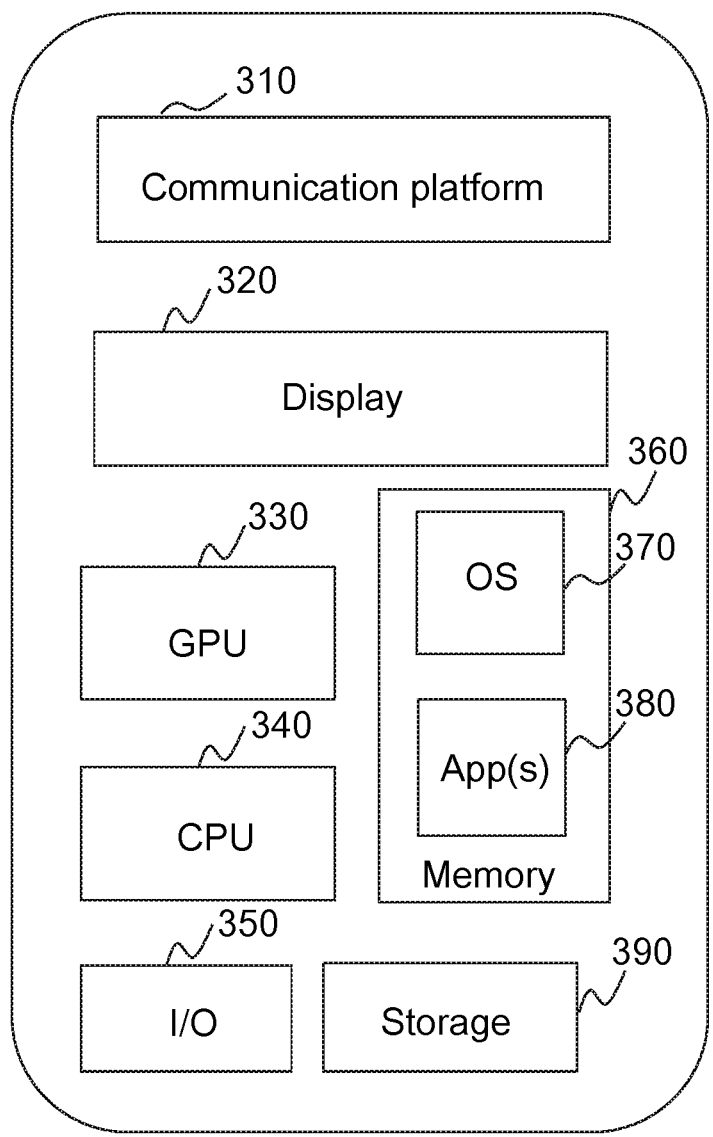
FIG. 3 is a schematic diagram illustrating exemplary hardware and/or software components of a mobile device on which a terminal may be implemented according to some embodiments of the present disclosure.

FIG. 3 is a schematic diagram illustrating exemplary hardware and/or software components of an exemplary mobile device on which the terminal 140 may be implemented according to some embodiments of the present disclosure. As illustrated in FIG. 3, mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in mobile device 300. In some embodiments, a mobile operating system 370 (e.g., iOS™, Android™, Windows Phone™, etc.) and one or more applications 380 may be loaded into memory 360 from storage 390 in order to be executed by CPU 340. Applications 380 may include a browser or any other suitable mobile apps for receiving and rendering information respect to data processing or other information from the processor 130. User interactions with the information stream may be achieved via I/O 350 and provided to processor 130 and/or other components of the image processing system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or external device. A computer may also act as a server if appropriately programmed.

The term "edge pixel" may refer to a pixel whose nearby pixels or a part thereof have significantly different gray values. In some embodiments, to determine whether two gray values of two pixels are significantly different, one or more following operations may be performed (e.g., by the image processing system 100). For example, the image processing system 100 may determine the vertical gradient of the two pixels and the horizontal gradient of the two pixels. The image processing system 10 may determine the ratio of the larger one among the determined gradients and the smaller one among the determined gradients. The image processing system 100 may determine the two gray values of the two pixels to be significantly different when the determined ratio is larger than 1.5. It should be noted herein that 1.5 may be an exemplary empirical value preset by a technician and is not intended to limit the scope of the present disclosure. In some embodiments, other values, such as 1, 2, and the like, may be set. The threshold may be a preset value stored in the image processing system 100, or may be a value determined according to different applications scenarios. In some embodiments, to determine whether a certain pixel is an edge pixel, a variance of the pixel values of its nearby pixels may be determined. The nearby pixels may be seen as having significantly different gray values when the variance exceeds a threshold. The threshold may be a preset value stored in the image processing system 100, or may be a value determined according to different applications scenarios.

FIG. 5 is a flowchart illustrating an exemplary process 500 for correcting a dead pixel according to some embodiments of the present disclosure. The process 500 may be implemented on an electronic device. The electronic device may include but not limited to an imaging sensor, an image processor, an image acquisition device, or the like, or any combination thereof. In some embodiments, one or more components in the electronic device may be implemented on one or more components in the image processing system 100. For example, the electronic device may be implemented on the processor 130 and/or the terminal 140. In some embodiments, one or more steps in the process may be implemented in the image processing system 100 illustrated in FIG. 1. For example, one or more steps in the process may be stored in the storage device 150 as a form of instructions, and invoked and/or executed by the processor 130 (e.g., the processor 130 in the processor 130, or the processor 220 of the processor 130 in the processor 130).

In 510, the electronic device may determine a pixel of interest in an image and an N*N pixel matrix centered on the pixel of interest. The N*N pixel matrix may be divided into different portions, such as an inner ring and an outer ring.

The inner ring may include a pixels adjacent to the pixel of interest in the pixel matrix, and the outer ring may surround the inner ring and include b pixels. Each of the b pixels in the outer ring may be at least one column or one row apart from the pixel of interest in the pixel matrix. Both a and b may be integers greater than 1.

Figure 7:
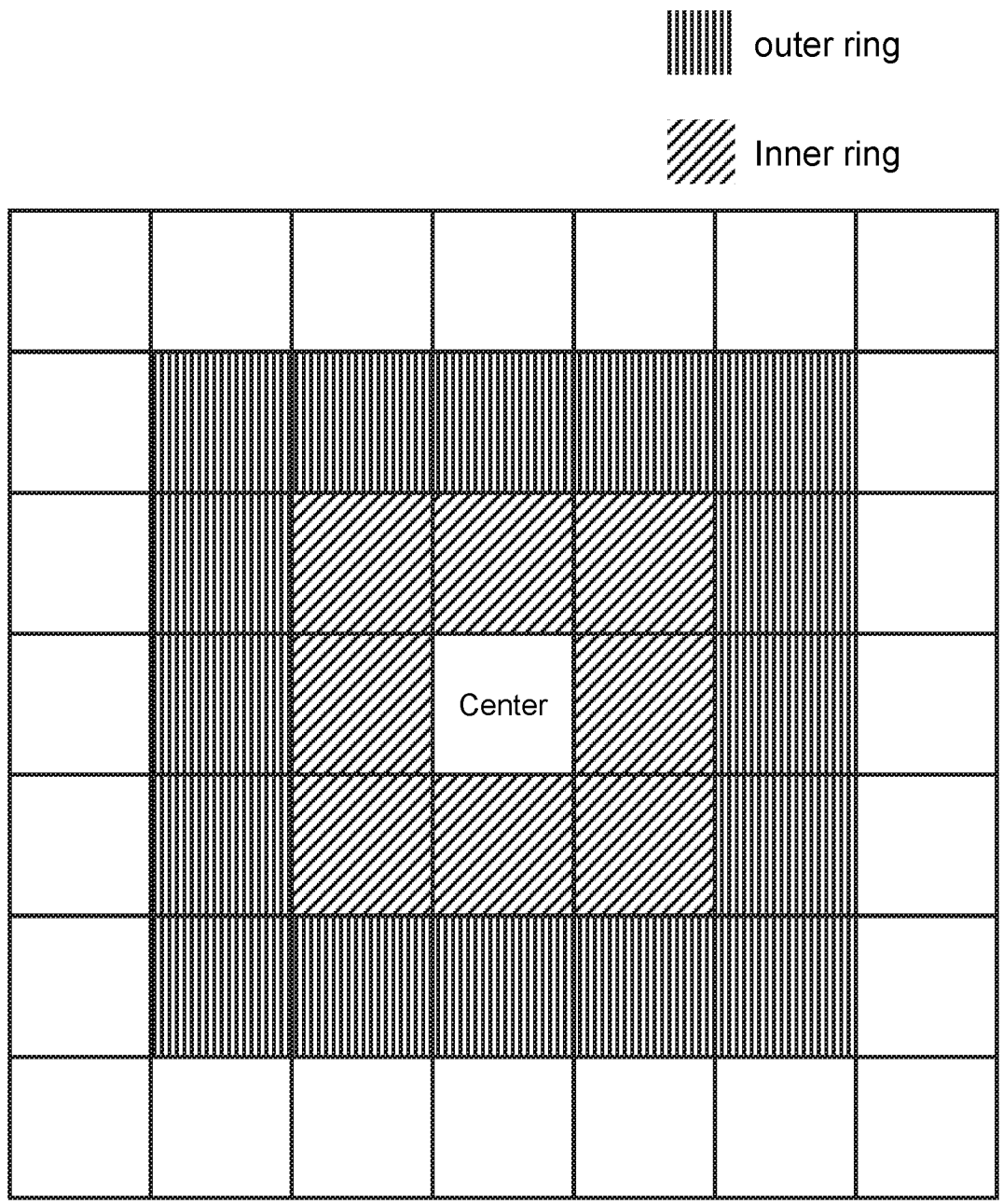
FIG. 7 is a schematic diagram illustrating an exemplary inner ring and an exemplary outer ring according to some embodiments of the present disclosure.

For example, as shown in FIG. 7, taking the 7*7 pixel matrix as an example, the inner ring includes 8 pixels around the pixel of interest (e.g., the pixel marked with "center") and the outer ring includes 16 pixels that surround the inner ring, wherein a is 8 and b is 16. As used herein, the pixels in the inner ring and the outer ring of the pixel of interest may be referred to as pixels proximate to the pixel of interest.

For illustration purpose, the image may be a Bayer image and the corresponding channel of the pixel of interest may be referred to as the target channel. Operation 510 may be executed by the electronic device. In some embodiments, the pixel of interest may be an fth pixel of the image. f may be a positive integer no greater than the number of pixels in the image. For example, as shown in FIG. 6, the Bayer image has 49 pixels, and f may be any positive integer not greater than 49, such as 1, 2, 3, . . . , 49. N may be an odd number that is greater than 1, for example, 3, 5, or 7. As shown in FIG. 6, N may be 7, and thus a 7*7 pixel matrix is centered on the pixel of interest R33.

Additionally or alternatively, before the N*N pixel matrix centered on the pixel of interest is determined, the electronic device may mirror upper boundary, lower boundary, left boundary or right boundary of the image. For example, if pixel B00, which locates at the edge of the Bayer image, is selected as the pixel of interest. To determine an N*N pixel matrix centered on pixel B00, the electronic device may need to, in advance, mirror the upper and left boundaries of the image to add at least one row above the pixel B00, and at least one column to the left of the pixel B00. Detailed descriptions of mirroring boundaries of an image may be found elsewhere in the present disclosure, e.g. operation 1110 in FIG. 11, and the description thereof.

In some embodiments, the image may have a resolution, for example, 1280×720, which means that the image has 720 lines of pixels and each line has 1280 pixels. The upper boundary of the image may refer to the first line of the image. The lower boundary of the image may refer to the last line of the image. The first pixel in each line may form the first column of the image which may be referred to as the left boundary of the image. The last pixel in each line may form the last column of the image which may be referred to as the right boundary of the image. As shown in FIG. 4, the upper boundary is the first line from top to down, which includes pixels B00, G01, B02, G03, B04, G05, and B06. The lower boundary is the last line from top to down, which includes pixels B60, G61, B62, G63, B64, G65, and B66. The left boundary is the first column from left to right, which includes pixels B00, G10, B20, G30, B40, G50, and B60. The right boundary is the last column from left to right, which includes pixels B06, G16, B26, G36, B46, G56, and B66.

In 520, the electronic device may determine whether the pixel of interest is an edge pixel.

In some embodiments, to determine whether the pixel of interest is an edge pixel, the electronic device may determine a variance of pixel values of pixels corresponding to a same channel (e.g., the G channel) in the N*N pixel matrix. For example, the variance of all green pixels in a 7*7 pixel matrix as shown in FIG. 4 may be determined according to the following equation.

$$f = \frac{1}{7 \times 7} \sum_{i=0, j=0}^{6,6} (G(i, j) - \bar{G})^2 \qquad (1)$$

wherein f refers to the variance, G(i,j) refers to the pixel value of a green pixel in the 7*7 pixel matrix, $\bar{G}$ refers to a mean of the pixel values of all the green pixels.

In some embodiments, the electronic device may determine whether the variance is greater than a first threshold TH1. If the variance is greater than the first threshold TH1, the electronic device may determine the center pixel as an edge pixel. Otherwise, the electronic device may determine the center pixel as a non-edge pixel. The first threshold may be a preset value stored in the image processing system 100, or may be a value determined according to different applications scenarios.

Additionally or alternatively, if the electronic device determines that the pixel of interest is an edge pixel, the electronic device may execute operation 530.

In 530, the electronic device may perform a homochromatic pre-correction operation on the N*N pixel matrix.

In some embodiments, one or more dead pixels may exist in the inner ring and/or the outer ring. To avoid directly taking account of the dead pixels in subsequent operations, the pixel values of the homochromatic pixels in the inner ring and the outer ring may be pre-processed. For example, all the pixel values of the homochromatic pixels may be ranked. If the difference between the maximum value and the second maximum value is greater than TH2, the maximum value may be modified to be the second maximum value. As used herein, the pixel in the outer ring that has the same color as the pixel of interest and has the maximum pixel value in the outer ring may be referred to as the first pixel. The pixel in the outer ring that has the same color as the pixel of interest and has the second maximum pixel value in the outer ring may be referred to as the second pixel. If the difference between the minimum value and the second minimum value is greater than TH3, the minimum value may be modified to be the second minimum value. The pixel in the outer ring that has the same color as the center pixel and has the minimum pixel value in the outer ring may be referred to as the third pixel, the pixel in the outer ring that has the same color as the center pixel and has the second minimum pixel value in the outer ring may be referred to as the fourth pixel. In some embodiments, the second threshold TH2 and the third threshold may be preset values stored in the system, or may be values determined according to different applications scenarios. The TH2 and TH3 may be the same.

In 540, the electronic device may convert the color of each pixel in the inner ring and color of each pixel in the outer ring to the same color of the center pixel, and determine a converted pixel value of each pixel in the inner ring and the outer ring.

In some embodiments, the operation 540 may be implemented by the following operations.

Firstly, the electronic device may determine an E color difference value and an F color difference value of each pixel. E color difference value or an F color difference value of each pixel may be referred to as a color difference.

Specifically, taking the 7*7 pixel matrix shown in FIG. 6 as an example, for each pixel in the central 5×5 sub-matrix of the 7*7 pixel matrix, the electronic device may determine three components, e.g., the R (Red) component, the G (Green) component, and the B (Blue) component. Then, the E color difference value and the F color difference value may be determined based on the three above mentioned components. For a certain pixel, the E color difference value and the F color difference value may be determined according to the following equations:

$$E = B - G \qquad (2)$$

$$F = R - G \qquad (3)$$

The determination of the three components may be implemented by using the same-color channel mean interpolation techniques, or other techniques. The techniques for the determination of the three components are not specifically limited in the present disclosure. In a Bayer image, for a certain pixel which corresponds to a first color channel, the pixel value of the certain pixel may suggest the first color component of the certain pixel, and the other two color components of the certain pixel may be determined based on one or more pixel values of the pixels surrounding the certain pixel. Taking the pixel G12 in FIG. 6 as an example, the R component and the B component of G12 may be determined according to the following equations:

$$R = (R11 + R13)/2 \qquad (4)$$

$$B = (B02 + B22)/2 \qquad (5)$$

Secondly, the electronic device may determine an E color difference average value (Uavg, or referred to as a color difference corresponding to the pixel matrix) based on the determined E color difference values, and an F color difference average value (Vavg) based on the determined F color difference values.

Thirdly, for each heterochromatic pixel of the pixel of interest in the inner ring and the outer ring, the electronic device may determine a converted pixel value (or referred to herein as a pseudo pixel value) based on the E color difference average value, the F color difference average value, and the pixel value of the heterochromatic pixel.

The term "heterochromatic pixel" may refer to a pixel which has a different color from the pixel of interest. The term "homochromatic pixel" may refer to a pixel which has the same color with the pixel of interest.

Taking the 7*7 pixel matrix shown in FIG. 4 as an example, pixels marked with "green", such as G12, G14, G21, G23, G25, G32, G34, G41, G43, G45, G52, G54, or the like, may be some heterochromatic pixels of the pixel of interest R33. Pixels marked with "blue", such as B22, B24, B42, and B44, or the like, may also be some heterochromatic pixels of the pixel of interest R33. Pixels marked with "red", such as R11, R13, R15, or the like may be homochromatic pixels of the pixel of interest R33.

For each heterochromatic pixel in the central 5×5 sub-matrix of the 7*7 pixel matrix, the converted pixel value may be determined according to a color difference mean interpolation technique using the following equations:

$$r12 = G12 + F\text{avg} \qquad (6)$$

$$r14 = G14 + F\text{avg} \qquad (7)$$

$$r21 = G21 + F\text{avg} \qquad (8)$$

$$r22 = B22 - E\text{avg} + F\text{avg} \qquad (9)$$

$$r23 = G23 + F\text{avg} \qquad (10)$$

$$r24 = B24 - E\text{avg} + F\text{avg} \qquad (11)$$

$$r25 = G25 + F\text{avg} \qquad (12)$$

$$r32 = G32 + F\text{avg} \qquad (13)$$

$$r34 = G34 + F\text{avg} \qquad (14)$$

$$r41 = G41 + F\text{avg} \qquad (15)$$

$$r42 = B42 - E\text{avg} + F\text{avg} \qquad (16)$$

$$r43 = G43 + F\text{avg}$$

$$r44 = B44 - Eavg + Favg \quad (17)$$

$$r45 = G45 + Favg \quad (18)$$

$$r52 = G52 + Favg \quad (19)$$

$$r54 = G54 + Favg \quad (20)$$

where Gij and Bij represent the pixel value of a certain heterochromatic pixel, respectively, Eavg represents the E color difference average value, Favg represents the F color difference average value, and rij represents the converted pixel value (or referred to herein as a pseudo pixel value) of the certain heterochromatic pixel. After converting, the central 5×5 sub-matrix may be shown in FIG. 8.

Using the color difference mean interpolation technique as illustrated above may not only improve the interpolation accuracy, but also effectively reduce the influence of the presence of dead pixels, and improve the accuracy of the detection of dead pixels.

In some embodiments, heterochromatic pixels of the pixel of interest in the inner ring and the outer ring may be converted to have the same color as the pixel of interest, and the homochromatic pixels of the pixel of interest may not be processed. The original information of these homochromatic pixels, which may be further used in the detection and the correction of the dead pixel, are retained, which may enhance the precision and accuracy of the detection and correction of the dead pixel.

In 550, the electronic device may perform a pre-correction operation on the inner ring and the outer ring of the N*N pixel matrix.

In some embodiments, when the maximum value of the converted pixel values of the pixels in the inner ring is greater than the second maximum value of the converted pixel values of the pixels in the inner ring and the outer ring, and the difference between the maximum value of the converted pixel values of the pixels in the inner ring and the second maximum value of the converted pixel values of the pixels in the inner ring and the outer ring is greater than a fourth threshold TH4, the electronic device may modify the maximum value of the converted pixel values of the pixels in the inner ring to be the second maximum value of the converted pixel values of the pixels in the inner ring and the outer ring.

Additionally or alternatively, when the minimum value of the converted pixel value of the pixels in the inner ring is smaller than the second minimum value of the converted pixel value of the pixels in the inner ring and the outer ring, and the difference between the minimum value of the converted pixel value of the pixels in the inner ring and the second minimum value of the converted pixel value of the pixels in the inner ring and the outer ring is greater than the fifth threshold TH5, the electronic device may modify the minimum value of the converted pixel value of the pixels in the inner ring to be the second minimum value of the converted pixel value of the pixels in the inner ring and the outer ring.

In some embodiments, when the second maximum value of the converted pixel value of the pixels in the inner ring is greater than the third maximum value of the converted pixel value of the pixels in the inner ring and the outer ring, and the difference between the second maximum value of the converted pixel value of the pixels in the inner ring and the third maximum value of the converted pixel value of the pixels in the inner ring and the outer ring is greater than the sixth threshold TH6, the electronic device may modify the second maximum value of the converted pixel value of the pixels in the inner ring to be the third maximum value of the converted pixel value of the pixels in the inner ring and the outer ring.

In some embodiments, when the second minimum value of the converted pixel value of the pixels in the inner ring is smaller than the third minimum value of the converted pixel value of the pixels in the inner ring and the outer ring, and the difference between the second minimum value of the converted pixel value of the pixels in the inner ring and the third minimum value of the converted pixel value of the pixels in the inner ring and the outer ring is greater than an seventh threshold TH7, the electronic device may modify the second minimum value of the converted pixel value of the pixels in the inner ring to be the third minimum value of the converted pixel value of the pixels in the inner ring and the outer ring.

In some embodiments, the TH4, TH5, TH6, and TH7 may be determined based on the estimated noise value of the N*N pixel matrix. The estimated noise value of the N*N pixel matrix may be determined by the electronic device through performing one or more of the following operations. For example, the electronic device may obtain a white balance card (e.g., gray card) which corresponds to the current ambient lighting condition. A white balance card corresponding to the current ambient lighting condition may refer to a white balance card that have been tested under an ambient lighting condition which is the same as the ambient lighting condition. Merely by way of example, the electronic device may obtain said white balance card by selecting it from a plurality of reference white balance cards that have been tested under different ambient lighting conditions and are pre-stored in the image processing system 100. The electronic device may calculate the mean value of pixels values of the pixels in the white balance cars. The electronic device may, for each pixel in the N*N pixel matrix, determine a difference between the pixel value of the pixel in the N*N pixel matrix and the calculated mean value. Further, the electronic device may determine the mean value of the determined differences to be the estimated noise value of the N*N pixel matrix. After determining the estimated noise value of the N*N pixel matrix, the electronic device may determine the TH4, TH5, TH6, and TH7 based on the estimated noise value of the N*N pixel matrix. In some embodiments, the electronic device may determine the TH4, TH5, TH6, and TH7 based on the estimated noise value of the N*N pixel matrix to meet the needs of different application scenarios. For example, the electronic device may determine smaller TH4, TH5, TH6, and TH7 when a smoother image is required, while determine larger TH4, TH5, TH6, and TH7 when more details in the image are required.

In 560, the electronic device may determine the pixel of interest as a dead pixel based on the determined converted pixel values of the pixels, and correct the pixel of interest.

In some embodiments, the operation 560 may be implemented by the following operations.

In some embodiments, when the pixel value of the pixel of interest is greater than the maximum value of the converted pixel values of the pixels in the inner ring and the outer ring, and the difference between the pixel value of the pixel of interest and the maximum value is greater than an eighth threshold TH8, the electronic device may determine the pixel of interest as a dead pixel. In this case, the pixel of interest may be referred to as a light pixel. The eighth threshold TH8 may be determined based on the estimated noise value of the N*N pixel matrix. The determination of the estimated noise value of the N*N pixel matrix may be found elsewhere in the present disclosure, for example, in operation 550 and the description thereof. The determination of the eighth threshold TH8 may refer to the determination of the TH4, TH5, TH6, and TH7, which may be illustrated in operation 550 and the description thereof. In some embodiments, when the pixel value of the pixel of interest is smaller than the minimum value of the converted pixel value of the pixels in the inner ring and the outer ring, and the difference between the pixel value of the pixel of interest and the minimum value is greater than the ninth threshold TH9, the electronic device may determine the pixel of interest as dead pixel. In this case, the pixel of interest may be referred to as a dark pixel. The ninth threshold TH9 may be determined based on the estimated noise value of the N*N pixel matrix. The determination of the estimated noise value of the N*N pixel matrix may be found elsewhere in the present disclosure, for example, in operation 550 and the description thereof. The determination of the ninth threshold TH9 may refer to the determination of the TH4, TH5, TH6, and TH7, which may be illustrated in operation 550 and the description thereof.

It should be noted herein that, for pixels in an inner ring and an outer ring centered on a pixel of interest, converted pixel values of the pixels in the inner ring and the outer ring may include the converted pixel values of heterochromatic pixels, that is, the pseudo pixel values for the target channel of the heterochromatic pixels, and the pixel values of the homochromatic pixels.

Upon the determination that the pixel of interest is a dead pixel, the electronic device may then correct the pixel of interest. In some embodiments, the electronic device may determine at least one pixel pair, and a pixel pair having a minimum difference in pixel values in the at least one pixel pair, for the correction of the pixel of interest. As used herein a pixel pair may include pixel values of two pixels in the outer ring that are of the same color as the pixel of interest, and the two pixels may be symmetrical about the pixel of interest.

The electronic device may designate two homochromatic pixels along a horizontal line at the 0° direction that passes of the pixel of interest as a pixel pair. Additionally or alternatively, the electronic device may designate two homochromatic pixels along an oblique line at the 45° direction that passes the pixel of interest as a pixel pair (or referred to as a first reference pixel pair). Additionally or alternatively, the electronic device may designate two homochromatic pixels along a vertical line at the 90° direction that passes the pixel of interest as a pixel pair (or referred to as a second reference pixel pair). Additionally or alternatively, the electronic device may designate two homochromatic pixels along an oblique line at the 135° direction that passes the pixel of interest as a pixel pair. The schematic diagram of exemplary pixel pairs may be found in FIG. 9.

Figure 9:
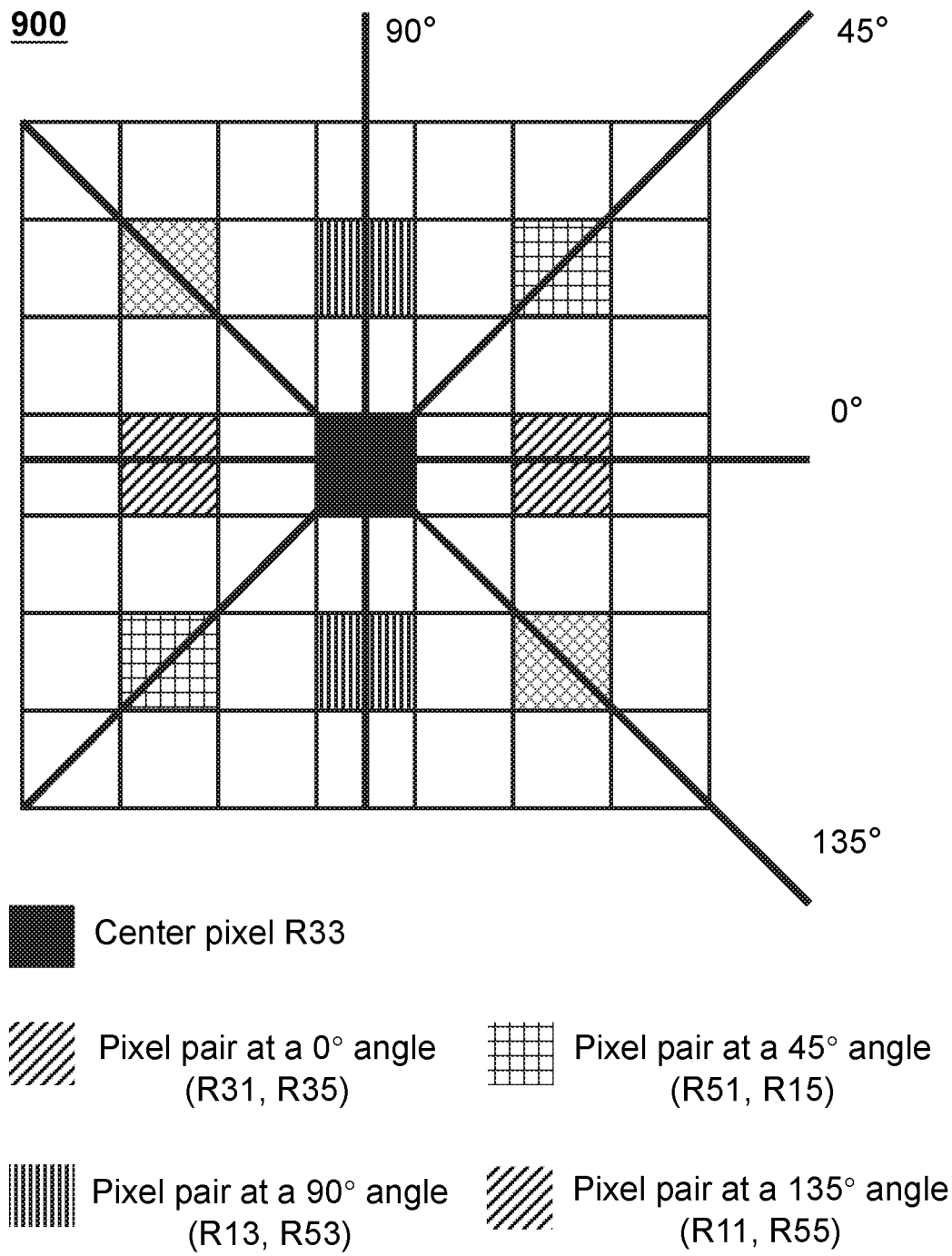
FIG. 9 is a schematic diagram illustrating exemplary pixel pairs according to some embodiments of the present disclosure.

Taking the pixel pairs shown in FIG. 9 as an example, the difference between a pixel pair may be determined according to the following equation:

$$grad0=|R31-R35| \qquad (21)$$

$$grad45=|R51-R15| \qquad (22)$$

$$grad90=|R13-R53| \qquad (23)$$

$$grad135=|R11-R55| \qquad (24)$$

wherein grad 0 refers to the difference between two homochromatic pixels along a horizontal line at the 0° direction that passes of the pixel of interest, grad 45 refers to the difference between two homochromatic pixels along an oblique line at the 45° direction that passes the pixel of interest, grad 90 refers to the difference between two homochromatic pixels along a vertical line at the 90° direction that passes the pixel of interest, grad 135 refers to the difference between two homochromatic pixels along an oblique line at the 135° direction that passes the pixel of interest.

Finally, the electronic device may modify the pixel value of the pixel of interest. In some embodiments, when the pixel value of the pixel of interest is a light pixel, the electronic device may modify the pixel value of the pixel of interest to be the larger value of pixel values in the pixel pair having the minimum difference in pixel values. For example, if grad45 is the minimum value among the four differences (e.g., grad0, grad45, grad90, and grad135), the pixel value of the pixel of interest may be modified to be the larger one of the pixel value between R51 and R15.

In some embodiments, when the pixel value of the pixel of interest is a dark pixel, the electronic device may modify the pixel value of the pixel of interest to be the smaller value of pixel values in the pixel pair having the minimum difference in pixel values. Referring to the above example, if grad 45 is the minimum value of the four differences (e.g., grad 0, grad 45, grad 90, and grad 135), the pixel value of the pixel of interest may be modified to be the smaller one of the pixel values between R51 and R15.

After determining that the pixel of interest is a non-edge pixel, operation 570 may be executed.

In 570, the electronic device may perform a pre-correction operation on the outer ring of the N*N pixel matrix.

Specifically, if the electronic device determines that the difference between the maximum value and the second maximum value of homochromatic pixels in the outer ring is greater than a tenth threshold T10, the maximum value may be modified to be the second maximum value.

Additionally or alternatively, if the electronic device determines that the difference between the minimum value and the second minimum value of homochromatic pixels in the outer ring is greater than an eleventh threshold T11, the minimum value may be modified to be the second minimum value.

Additionally or alternatively, if the electronic device determines that the difference between the second maximum value and the third maximum value of homochromatic pixels in the outer ring is greater than a twelfth threshold T12, the second maximum value may be modified to be the third maximum value.

Additionally or alternatively, if the electronic device determines that the difference between the second minimum value and the third minimum value of homochromatic pixels in the outer ring is greater than a thirteenth threshold T13, the second minimum value may be modified to be the third minimum value.

In some embodiments, the T10, T11, T12, and T13 may be determined based on the estimated noise value of the N*N pixel matrix. The determination of the estimated noise value of the N*N pixel matrix may be found elsewhere in the present disclosure, for example, in operation 550 and the description thereof. The determination of the T10, T11, T12, and T13 may refer to the determination of the TH4, TH5, TH6, and TH7, which may be illustrated in operation 550 and the description thereof.

After operation 570, operation 580 may be executed.

In 580, the electronic device may determine the pixel of interest as a dead pixel based on the homochromatic pixels, and may correct the pixel of interest.

When the pixel value of the pixel of interest is greater than the maximum value of the pixel values of the homochromatic pixels in the outer ring, and the difference between the pixel value of the pixel of interest and the maximum value is greater than a fourteenth threshold T14, the electronic device may determine the pixel of interest as a dead pixel. In some embodiments, the electronic device may determine at least one pixel pair, and the pixel pair having the minimum difference in pixel values in the at least one pixel pair. Then, the electronic device may modify the pixel value of the pixel of interest to be the larger one of pixel values in the pixel pair having the minimum difference in pixel values. The pixel pair may include pixel values of two pixels in the outer ring that are of the same color as the pixel of interest, and the two pixels are symmetrical about the pixel of interest. The TH14 may be determined based on the estimated noise value of the N*N pixel matrix.

When the pixel value of the pixel of interest is smaller than the minimum of the pixel value of the homochromatic pixel in the outer ring, and the difference between the pixel value of the pixel of interest and the minimum is greater than a fifteenth threshold TH15, the electronic device may determine the pixel of interest as dead pixel. In some embodiments, the electronic device may determine at least one pixel pair, and the pixel pair having the minimum difference in pixel values in the at least one pixel pair. Then, the electronic device may modify the pixel value of the pixel of interest to be the smaller value of pixel values in the pixel pair having the minimum difference in pixel values. The pixel pair may include pixel values of two pixels in the outer ring that are of the same color as the pixel of interest, and the two pixels are symmetrical about the pixel of interest. The TH15 may be determined based on the estimated noise value of the N*N pixel matrix. The determination of the estimated noise value of the N*N pixel matrix may be found elsewhere in the present disclosure, for example, in operation 550 and the description thereof. The determination of the TH15 may refer to the determination of the TH4, TH5, TH6, and TH7, which may be illustrated in operation 550 and the description thereof.

Figure 10:
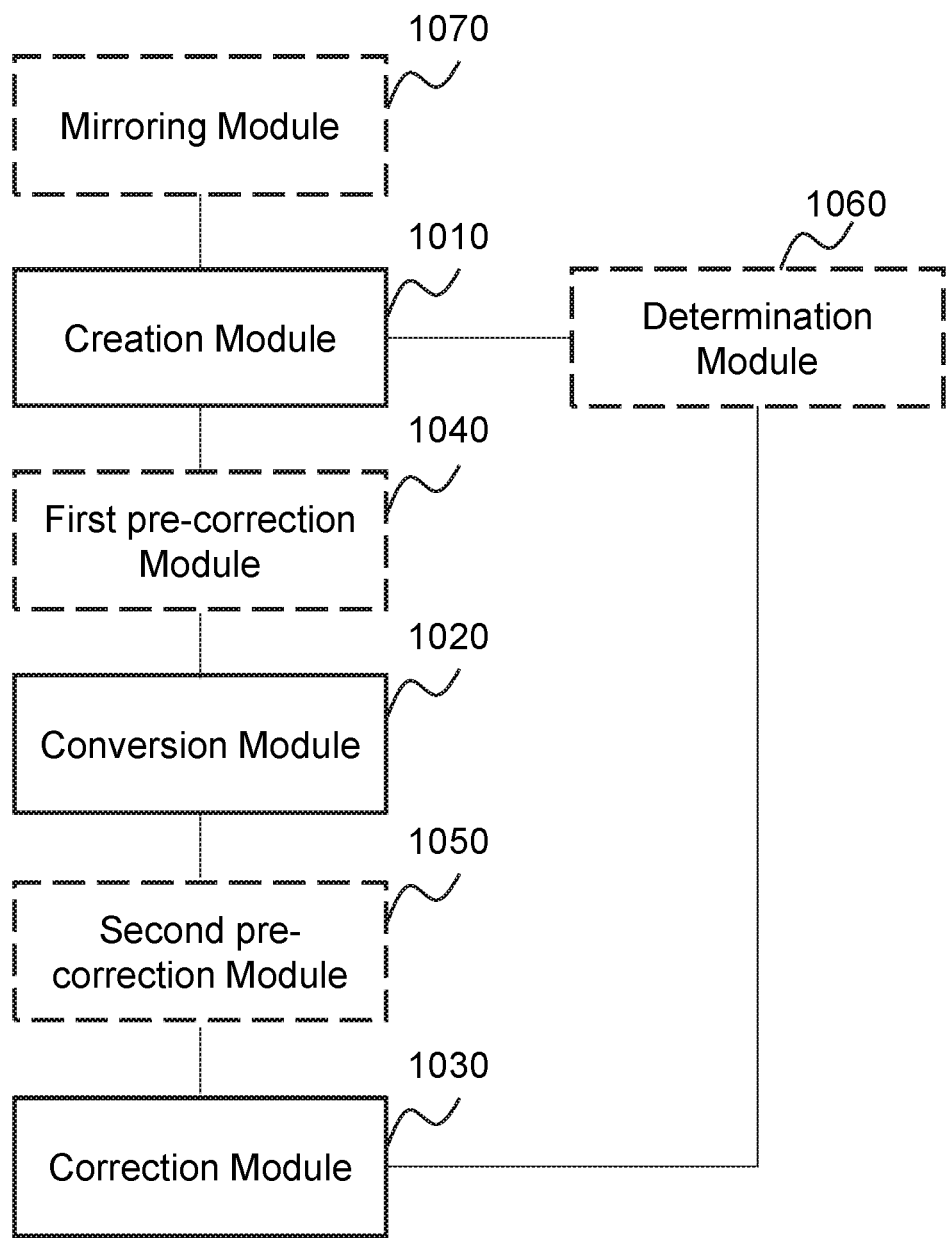
FIG. 10 is a block diagram illustrating an exemplary dead pixel correction device according to some embodiments of the present disclosure.

FIG. 10 is a block diagram illustrating an exemplary dead pixel correction device 1000 according to some embodiments of the present disclosure. The dead pixel correction device 1000 may include a creation module 1010, a conversion module 1020, and a correction module 1030.

The creation module 1010 may be configured to determine a pixel of interest and an N*N pixel matrix centered on the pixel of interest in an image. The N may be an odd number that is greater than 1.

The conversion module 1020 may be configured to convert the color of each pixel in an inner ring and an outer ring of the N*N pixel matrix to the same color as the pixel of interest, and determine the converted pixel values of the pixels. The inner ring may include a pixels adjacent to the pixel of interest in the pixel matrix, the outer ring may surround the inner ring and include b pixels. Each of the b pixels in the outer ring may be at least at least one column, or one row apart from the pixel of interest in the pixel matrix. Both a and b may be integers greater than 1.

In some embodiments, the conversion module 1020 may be configured to determine an E color difference value and an F color difference value of a pixel. The conversion module 1020 may also be configured to determine an E color difference average value based on the E color difference values of different pixels, and an F color difference average value based on the F color difference values of different pixels. For each heterochromatic pixel in the inner ring and the outer ring of the N*N pixel matrix, the conversion module 1020 may further be configured to determine a converted pixel value based on the E color difference average value, the F color difference average value, and the pixel value of the heterochromatic pixel.

The correction module 1030 may be configured to determine the pixel of interest as a dead pixel based on the converted pixel values of the pixels, and correct the pixel of interest.

In some embodiments, the correction module 1030 may be configured to determine the maximum value of the converted pixel values of the pixels in the inner ring and the outer ring, and determine the pixel of interest as a dead pixel when the pixel value of the pixel of interest is greater than the maximum value, and a first difference between the pixel value of the pixel of interest and the maximum is greater than a first threshold. The correction module 1030 may also be configured to determine at least one pixel pair, and a pixel pair which has the minimum difference in pixel values in the at least one pixel pair. The pixel pair may include pixel values of two pixels in the outer ring that are of the same color as the pixel of interest, and the two pixels may be symmetrical about the pixel of interest. The correction module 1030 may further be configured to correct the pixel value of the pixel of interest to be the larger value of pixel values in the pixel pair.

In some embodiments, the correction module 1030 may be configured to determine the minimum value of the converted pixel value of the pixels in the inner ring and the outer ring, and determine the pixel of interest as a dead pixel when the pixel value of the pixel of interest is smaller than the minimum value, and a second difference between the pixel value of the pixel of interest and the minimum value is greater than a second threshold. The correction module 1030 may also configured to determine at least one pixel pair, and a pixel pair which has the minimum difference in pixel values in the at least one pixel pair. The pixel pair may include pixel values of two pixels in the outer ring that are of the same color as the pixel of interest, and the two pixels may be symmetrical about the pixel of interest. The correction module 1030 may be further configured to correct the pixel value of the pixel of interest to be the smaller value of pixel values in the pixel pair.

In some embodiments, the dead pixel correction device 1000 may further include a first pre-correction module 1040. The first pre-correction module 1040 may be configured to modify the pixel value of a first pixel to be the pixel value of a second pixel when the difference between the pixel value of the first pixel and the pixel value of the second pixel is greater than a third threshold. The first pixel may be a pixel in the outer ring that has the same color as the pixel of interest and has the maximum pixel value in the outer ring, the second pixel may be a pixel in the outer ring that has the same color as the pixel of interest and has the second maximum pixel value in the outer ring.

Before converting the color of each pixel in an inner ring and the color of each pixel in an outer ring to the same color of the pixel of interest, and determining a converted pixel value of the pixels, the pixel value of a third pixel may be modified to be the pixel value of a fourth pixel when a fourth difference between the pixel value of the third pixel and the pixel value of the fourth pixel is greater than a fourth threshold. The third pixel may be a pixel in the outer ring that has the same color as the pixel of interest and has the minimum pixel value in the outer ring, and the fourth pixel may be a pixel in the outer ring that has the same color as the pixel of interest and has the second minimum pixel value in the outer ring.

In some embodiments, the dead pixel correction device 1000 may further include a second pre-correction module 1050. The second pre-correction module 1050 may be configured to modify the maximum value of the converted pixel values of the pixels in the inner ring to be the second maximum value of the converted pixel values of the pixels in the inner ring and the outer ring when the maximum value of the converted pixel values of the pixels in the inner ring is greater than the second maximum value of the converted pixel values of the pixels in the inner ring and the outer ring, and the difference between the maximum value of the converted pixel values of the pixels in the inner ring and the second maximum value of the converted pixel values of the pixels in the inner ring and the outer ring is greater than a fifth threshold.

The second pre-correction module 1050 may be configured to modify the minimum value of the converted pixel value of the pixels in the inner ring to be the second minimum value of the converted pixel value of the pixels in the inner ring and the outer ring when the minimum value of the converted pixel value of the pixels in the inner ring is smaller than the second minimum value of the converted pixel value of the pixels in the inner ring and the outer ring, and the sixth difference between the minimum value of the converted pixel value of the pixels in the inner ring and the second minimum value of the converted pixel value of the pixels in the inner ring and the outer ring is greater than a sixth threshold.

The second pre-correction module 1050 may be configured to modify the second maximum value of the converted pixel value of the pixels in the inner ring to be the third maximum value of the converted pixel value of the pixels in the inner ring and the outer ring when the second maximum value of the converted pixel value of the pixels in the inner ring is greater than the third maximum value of the converted pixel value of the pixels in the inner ring and the outer ring, and the seventh difference between the second maximum value of the converted pixel value of the pixels in the inner ring and the third maximum value of the converted pixel value of the pixels in the inner ring and the outer ring is greater than a seventh threshold.

The second pre-correction module 1050 may be configured to modify the second minimum value of the converted pixel value of the pixels in the inner ring to be the third minimum value of the converted pixel value of the pixels in the inner ring and the outer ring when determining the second minimum value of the converted pixel value of the pixels in the inner ring is smaller than the third minimum value of the converted pixel value of the pixels in the inner ring and the outer ring, and an eighth difference between the second minimum value of the converted pixel value of the pixels in the inner ring and the third minimum value of the converted pixel value of the pixels in the inner ring and the outer ring is greater than an eighth threshold.

In some embodiments, the image dead pixel correction device 1000 may further include a determination module 1060. The determination module 860 may be configured to determine a variance of pixel values of all green (G) pixels in the N*N pixel matrix, and determine that the variance is greater than a ninth threshold before the conversion module 1020 converts the color of each pixel in the inner ring and the outer ring of the N*N pixel matrix to the same color of the pixel of interest, and determines the converted pixel values of the pixels.

In some embodiments, the determination module 1060 may be further configured to determine whether the variance is smaller than or equal to the ninth threshold after determining the variance of pixel values of all green (G) pixels in the N*N pixel matrix.

In some embodiments, the dead pixel correction device 1000 may further include a mirroring module 1070. The mirroring module 1070 may be configured to mirror upper boundary, lower boundary, left boundary and/or right boundary of the image before the creation module 1010 determines the pixel of interest and the N*N pixel matrix centered on the pixel of interest.

As illustrated above, one aspect of the present disclosure provide an image processing system 100 and a method (e.g., as illustrated in FIG. 5 and the description thereof) to determine dead pixels in a Bayer image, and correct the determined dead pixels. In some embodiments, according to another aspect of the present disclosure, the image processing system 100 may also be configured to implement a method for correcting the false color and reducing color noise in an image. Detailed descriptions may be illustrated as follows.

The processes provided in the embodiments of the present disclosure may be applied to processing images in YUV color space. In YUV color space, Y refers to the Luminance (or Luma), i.e., the grey value. U and V denote the chrominance (or chroma), and are used to describe the color and saturation of images, which may also be used to designate the color of pixels. The luminance signal Y and chrominance signal U/V in YUV color space may be separated.

In the following embodiments of the present disclosure, a U channel may be used to represent the U signal component, a V channel may be used to represent the V signal component.

Generally, the false color may exist in high-frequency areas such as edges and textures of images. As used herein, an image may be regarded as having a false color if the color of at least one pixel presented in the image is different from the true color of the at least one pixel presented in a photograph (e.g., a true color image). The color noise may exist in low-frequency areas where the content in the image is flat and smooth. Thus, in some embodiments, false color and color noise in an image may be processed respectively basing on different regions.

Figure 11B:
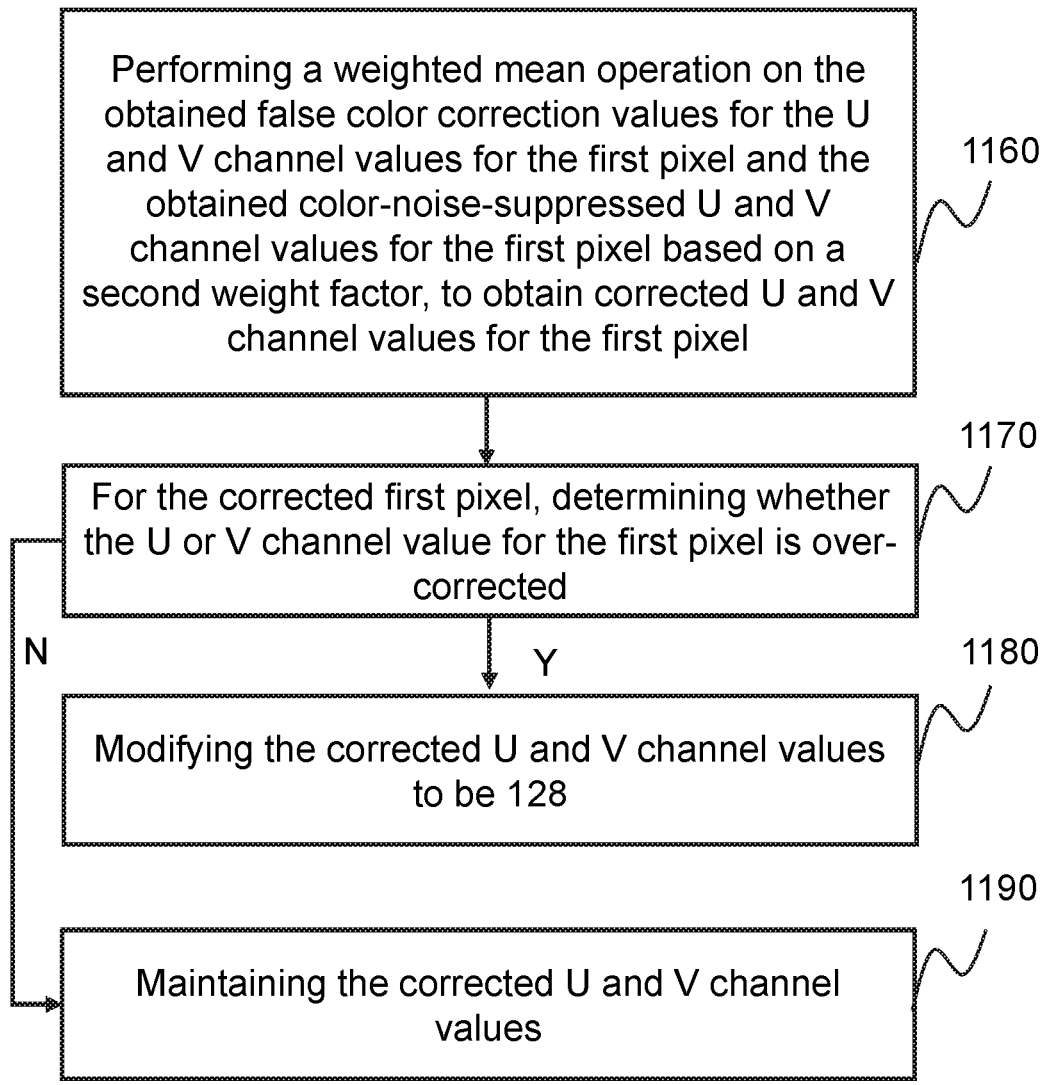
FIG. 11B is a flowchart illustrating an exemplary process and/or method for correcting false color according to some embodiments of the present disclosure.

FIGS. 11A and 11B are flowcharts of an exemplary processes 1100 for correcting false color according to some embodiments of the present disclosure. The process 1100 may be implemented on an electronic device. The electronic device may include but not limited to an imaging sensor, an image processor, an image acquisition device, or the like, or any combination thereof. In some embodiments, one or more components in the electronic device may be implemented on one or more components in the image processing system 100. For example, the electronic device may be implemented on the processor 130 and/or the terminal 140. In some embodiments, one or more steps in the processes 1100 may be implemented in the image processing system 100 illustrated in FIG. 1. For example, one or more steps in the process 1100 may be stored in the storage device 130 and/or the storage (e.g., the ROM 230, the RAM 240) as a form of instructions, and invoked and/or executed by the processor 130 (e.g., the processing engine 112 in the processor 130, or the processor 220 of the processing engine 112 in the processor 130).

In 1110, a first pixel, a first region and a second region both centered on the first pixel may be determined in an image.

In some embodiments, one pixel in the image may be designated as the first pixel. The first pixel may be regarded as a pixel of interest. In some embodiments, a false color area in the image may be identified, and the pixel of interest may be determined within the false color area. As used herein, a false color area in an image may refers to an area which has false color.

In some embodiments, the first region may be an M*M pixel block, the second region may be an N*N pixel block. M and N may both be integers greater than 1. M may be smaller than N. M (or N) may be an odd number or an even number. When M (or N) is an even number, the first region (or the second region) may not be actually centered on the first pixel. When M (or N) is an odd number, the first region (or the second region) may be centered on the first pixel.

In some embodiments, a plurality of first pixels and, accordingly, a plurality of first regions and second regions corresponding to the first pixels, may be determined sequentially, using a sling window. The sliding window may be of the same size of the first region (or the second region) during the sequential processing of the plurality of first regions (or the plurality of second regions). When processing a certain first pixel, the sliding window be centered on the first pixel, and may cover a first region (or a second region) of the center pixel. As illustrated above, the first region (or the second region) may be even-numbered when M (or N) is an even number, or odd-numbered-when M (or N) is an odd number. Accordingly, the sliding window may be an even-numbered window, or an odd-numbered window. In some embodiments, when sliding window is an even-numbered window, the first region (or the second region) may not be actually centered on the first pixel, a certain distance shift in the image may occur, the image be moved to a certain distance in one direction as a whole.

Specifically, when using an even-numbered window to process a certain pixel, for example, pixel X, the window may not be actually centered on the certain pixel. In some embodiments, more pixels in the left part (or right part) of the image may be used to process pixel X, resulting in a processed pixel X with pixel values more affected by the pixels in the left part of the image, that is, the pixel X may be regarded to have a distance shift in the image to the left direction. The above phenomenon may not be appeared when using an odd-numbered window. When using an odd-numbered window to process a certain pixel, for example, pixel X, the window may be actually centered on the certain pixel, sparing the distance shift.

Figure 12A:
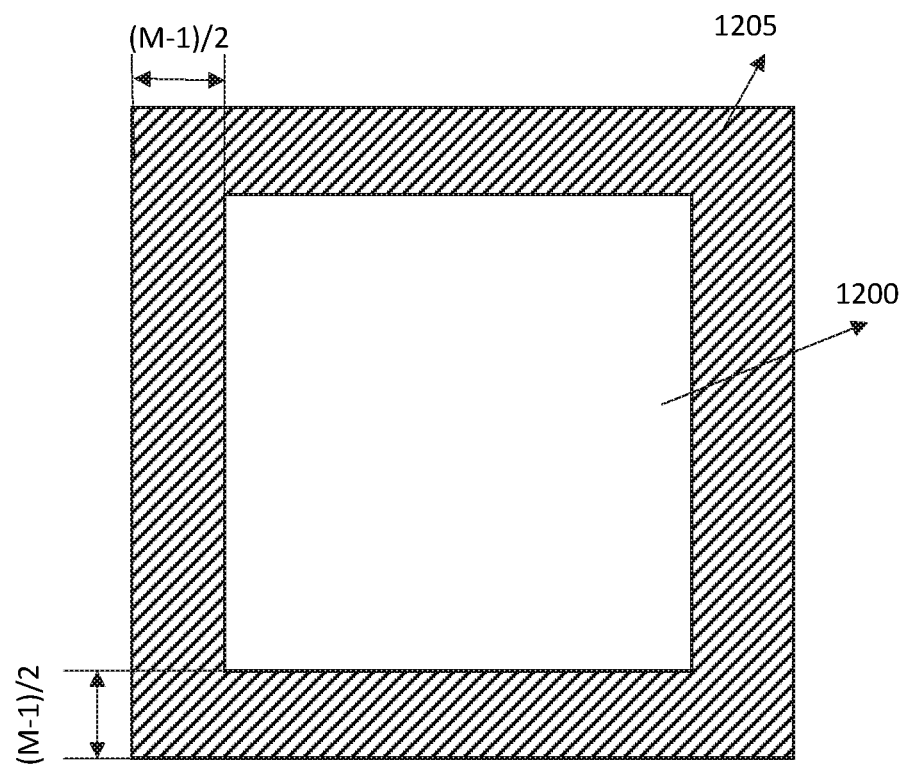
FIGS. 12A and 12B are block diagrams illustrating an exemplary image sliding window according to some embodiments of the present disclosure.

In some embodiments, when the first pixel, which the sliding window is centered on, is located on a boundary of the image, at least part of the sliding window may cover a vacant part (i.e., without pixels) in the image. For example, when a pixel of interest is the upper left pixel in the image, the upper half part and the left half part of the first region (or the second region) that is centered on the pixel of interest may be vacant. In some embodiments, to ensure that the part which an image sliding window of M*M pixels covers has no vacant part, the image may be expanded outwardly by (M−1)/2 pixels, as shown in FIG. 12A, where the central block 1200 may represent the pixels of interest that can be selected when using the image sliding window of the M*M pixel. The expansion portion of the image 1205 may be represented by shadows.

Figure 12B:
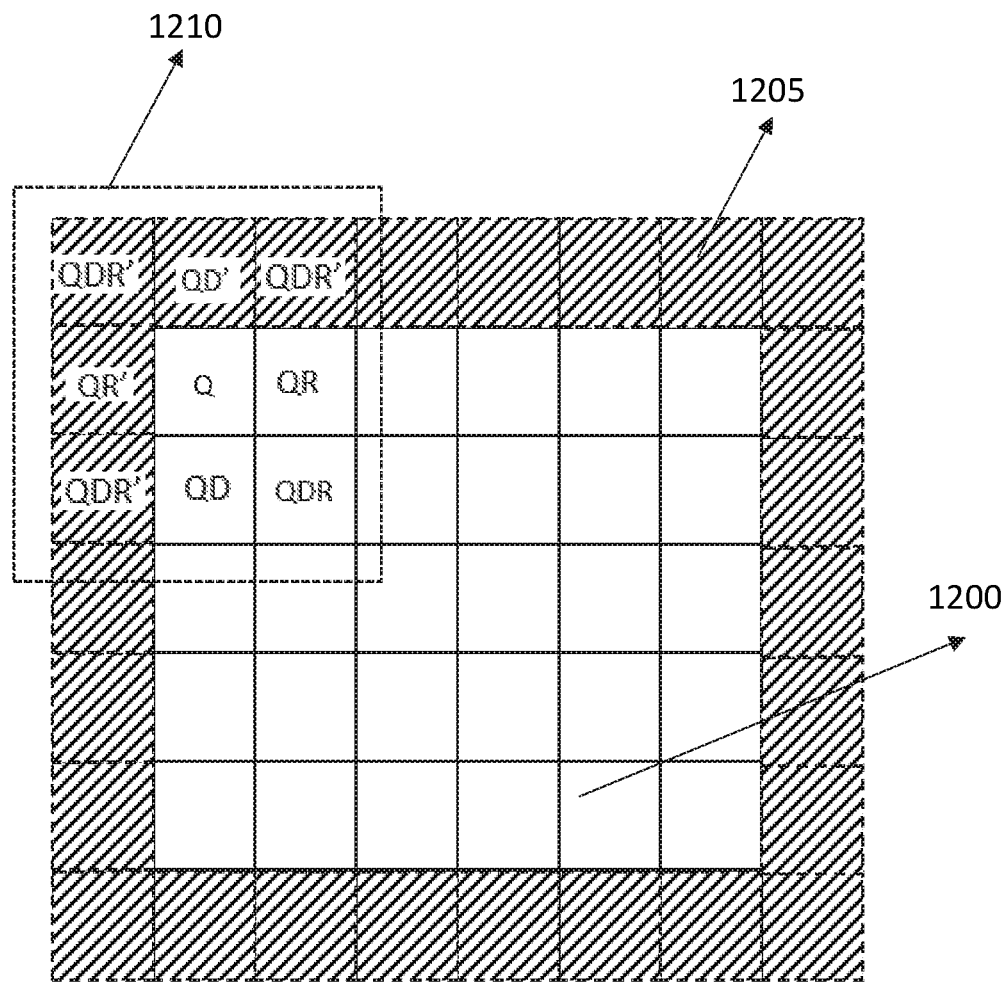

Certain operations, e.g., pixel mirroring operations, may be performed to expand the image to fill the said vacant part to expand the image. For example, as illustrated in FIG. 12B, the pixel of interest may be pixel Q which is the upper left pixel in the image. The sliding window 1210 of a size of 3*3 may be centered on the pixel Q and may partially cover a central block 1200 and an expansion portion 1205 represented by shadows. In the center block 1200, pixel Q may be adjacent to pixel QR and pixel QD, which locate on the right side and the lower side of pixel Q, respectively. With pixel mirroring operations, pixel QR' may be filled into the expansion portion 1205 in the image. Pixel QR' may locate on the left side of pixel Q and may be adjacent to the pixel Q. Pixel QR' and pixel QR may be symmetric with respect to the left boundary (or pixel Q). Likewise, with pixel mirroring operations, pixel QD' may be filled into the expansion portion 2305 in the image. Pixel QD' may locate on the upper side of pixel Q and may be adjacent to the pixel Q. Pixel QD' and pixel QD may be symmetric with respect to the left boundary (or pixel Q). Also, pixel QDR' may be filled in to the expansion portion 1205. As used herein, for a certain pixel, pixel x' may have the same pixel value as pixel x.

In 1120, the electronic device may, for each pixel that satisfy a first condition in the first region, obtain a difference between a saturation of the pixel and a preset threshold, and determine a first weight factor corresponding to the first region based on a mean of the differences.

The electronic device may determine pixels that satisfy a first condition in the first region may be determined. For each pixel satisfying the first condition, the electronic device may determine a difference between the saturation information of the pixel and a preset threshold. In some embodiments, the threshold may be pre-stored in the image processing system 100 (e.g., in the storage device 150). In some embodiments, the threshold may be an empirical value set by a technician in the technical field. In some embodiments, the threshold may be determined by a trained machine learning model (e.g., a neutral network model). The input of the machine learning model may include parameters such as working life of the sensor which has captured the image, ambient light strength, or the like, or any combination thereof. The electronic device may further determine the first weight factor corresponding to the based on an average value of the determined differences.

In some embodiments, a first weight (or referred to herein as a first weight factor) corresponding to the pixel of interest of the first region may be determined based on the U channel values and V channel values (both may be referred to herein as values of chrominance channels) of the pixels of the first region.

Specifically, a set of the pixels that satisfy the first condition in the first area may be determined. The saturation information of each pixel, and an accumulated value which is the sum of differences between the saturation information of each pixel and the preset threshold may be determined. The differences may be obtained by subtracting the saturation information from the preset threshold. Then, the first weight corresponding to the pixel of interest may be determined based on the accumulated value and the number of the pixels in the set.

In some embodiments, the saturation information of a pixel may be used to represent a difference between the saturation of the pixel and the zero-saturation. In some embodiments, the saturation information of a pixel may be obtained by following operations. The maximum value between the absolute value of U channel saturation difference and the absolute value of V channel saturation difference may be determined. The U channel saturation difference may be equal to the U channel value minus a zero saturation U channel value (e.g., the U channel value when the saturation is zero), the V channel saturation difference is equal to the V channel value minus a zero saturation V channel value (e.g., the V channel value when the saturation is zero). In some embodiments, the saturation information may be determined according to the following equation (25):

$$\text{diff} = \text{MAX}(\text{abs}(\text{inData}M*M(i,j)-128), \text{abs}(\text{refData}M*M(i,j)-128)) \quad (25)$$

wherein DataM*M(i,j) refers to a pixel having the pixel coordinates (i,j), the pixel may be the center pixel of the first region of M*M size, inDataM*M(i,j) refers to the U channel value of the pixel, refDataM*M(i,j) refers to the V channel value of the pixel, the zero saturation U channel value and zero saturation V channel value may be zero, MAX( ) refers to the maximum value, diff refers to the saturation information of the pixel.

In some embodiments, the pixels that satisfy the first condition may be the pixels that the saturation information is smaller than the preset threshold. A value range of the preset threshold may be [0, 128]. Preferably, the preset threshold may be 10.

In some embodiments, the first weight corresponding to the first region, or corresponding to the pixel of interest of the first region (e.g., the center pixel in the first region) may be determined. The first weight may be used in subsequent operations, such as false color correction. In some embodiments, the first weight may be determined according to the following equation (26):

$$\text{wt} = \frac{\text{difference\_sum}}{\text{num}} \quad (26)$$

wherein wt refers to the first weight corresponding to the pixel of interest, difference_sum refers to the accumulated value of (thr1−diff) of pixels that satisfy the first condition in the first region, the (thr1−diff) of a pixel is the result by subtracting the saturation information of the pixel from the preset threshold, num refers to the number of the pixels that satisfy the first condition in the first region.

In 1130, the electronic device may perform a weighted mean operation on U and V channel values for the first pixel and average U and V channel values that correspond to the first region, to obtain false color pre-correction values for the U and V channel values for the first pixel. A false color pre-correction operation may be performed on the pixel of interest based on the first weight and the color channel (e.g., the U channel and the V channel, or referred to herein as a chrominance channel) of the pixel of interest. Specifically, an U channel false color pre-correction value of the pixel of interest (or referred to herein as a median value corresponding to the first region) may be obtained by performing a weighted mean operation on the U channel value of the pixel of interest and an U channel average value corresponding to the first region. The U channel average value may be a mean of the U channel values of the pixels in the first region. A V channel false color pre-correction value of the pixel of interest (or referred to herein as a median value corresponding to the first region) may be obtained by performing a weighted mean operation on the V channel value of the pixel of interest and a V channel average value corresponding to the first region. The V channel average value may be a mean of the V channel values of the pixels in the first region.

A false color pre-correction operation may be performed on the U channel value and the V channel value of the pixel of interest, respectively.

For the U channel of the pixel of interest, the false color pre-correction operation may be implemented by the following steps. An U channel average value corresponding to the first region may be determined. The U channel average value may be a mean of the U channel values of the pixels that satisfy the first condition in the first region. The U channel false color pre-correction value may be obtained by performing a weighted mean operation on the U channel value of the pixel of interest and the U channel average value corresponding to the first region. In some embodiments, the U channel false color pre-correction value may be determined according to the following equation (27):

$$\text{mean\_u\_cor} = \frac{(\text{wt\_global} * \text{cur\_u} + (\text{total} - \text{wt\_global}) * \text{mean\_u})}{\text{total}} \quad (27)$$

$$\text{wt}_{global} \in [\text{wt}_{min}, \text{wt}_{max}]$$

$$\text{total} = \text{wt}_{max} - \text{wt}_{min}$$

wherein mean_u_cor refers to the U channel false color pre-correction value of the pixel of interest, wt_global refers to the first weight corresponding to the pixel of interest, cur_u refers to the U channel value of the pixel of interest, mean_u refers to the U channel average value corresponding to the first region, $\text{wt}_{max}$ and $\text{wt}_{min}$ respectively refer to the maximum weight and the minimum weight that may be assigned to any pixel in the first region. The maximum weight and the minimum weight may be preset values stored in the image processing system 100.

For the V channel of the pixel of interest, the false color pre-correction operation may be implemented by the following steps. A V channel average value corresponding to the first region may be determined. The V channel average value may be an average value of the V channel values of the pixels that satisfy the first condition in the first region. The V channel false color pre-correction value may be obtained by performing a weighted mean operation on the V channel value of the pixel of interest and the V channel average value corresponding to the first region. In some embodiments, the V channel false color pre-correction value may be determined according to the following equation (28):

$$\text{mean\_v\_cor} = \frac{(\text{wt\_global} * \text{cur\_v} + (\text{total} - \text{wt\_global}) * \text{mean\_v})}{\text{total}} \quad (28)$$

wherein mean_v_cor refers to the V channel false color pre-correction value of the pixel of interest, cur_v refers to the V channel value of the pixel of interest, mean_v refers to the V channel average value corresponding to the first region. wt_global and total may hold the same meanings as that in equation (27).

In 1140, the electronic device may perform a weighted mean operation on U and V channel values for the first pixel and median U and V channel values that correspond to the first region, to obtain false color correction values for the U and V channel values for the first pixel. The median U and V channel values may be obtained after a median filtering operation. The median filtering operation may be performed at least based on the obtained false color pre-correction values for the U and V channel values for the first pixel Performing a weighted mean operation on E and F channel values for the first pixel and median E and F channel values that correspond to the first region, to obtain false color correction values for the E and F channel values for the first pixel, the median E and F channel values being obtained after a median filtering operation, the median filtering operation being performed at least based on the obtained false color pre-correction values for the E and F channel values for the first pixel A false color correction operation may be performed on the pixel of interest based on the first weight corresponding to the pixel of interest, the color channels (e.g., the U channel and the V channel) of the pixel of interest, and a result of a median filtering operation (or referred to herein as a median value corresponding to the first region). Specifically, an U channel false color correction value of the pixel of interest (or referred to herein as a first correction value) may be obtained by performing a weighted mean operation on the U channel value of the pixel of interest and a median-filtered U channel value of the first region (or referred to herein as a median value corresponding to the first region) based on the first weight corresponding to the first region. A V channel false color correction value of the pixel of interest (or referred to herein as a first reference correction value) may be obtained by performing a weighted mean operation on the V channel value of the pixel of interest and a median-filtered V channel value of the first region (or referred to herein as a median value corresponding to the first region) based on the first weight corresponding to the first region.

In some embodiments, the weighted mean operation on the U channel value of the pixel of interest and the median-filtered U channel value of the first region may be implemented according to the following equation (29):

$$fcc\_u = (\text{wt\_global} * cur\_u) + (\text{total} - \text{wt\_global}) * \text{med\_u} / \text{total} \quad (29)$$

wherein fcc_e refers to the U channel false color correction value of the pixel of interest, cur_e refers to the U channel value of the pixel of interest, wt_global refers to the first weight corresponding to the pixel of interest, med_e refers to the median-filtered U channel value of the first region. As used herein, (total−wt_global) may be referred to as a fourth weight factor for the median value.

In some embodiments, the weighted mean operation on the V channel value of the target and the median-filtered V channel value of the first region may be implemented according to the following equation (30):

$$fcc\_v = (\text{wt\_global} * cur\_v) + (\text{total} - \text{wt\_global}) * \text{med\_v} / \text{total} \quad (30)$$

wherein fcc_v refers to the V channel false color correction value of the pixel of interest, cur_v refers to the V channel value of the pixel of interest, med_v refers to the median-filtered V channel value of the first region.

In 1150, the electronic device may perform a color noise suppression operation on the first pixel based on the pixels in the second region, to obtain color-noise-suppressed U and V channel values for the first pixel.

A color noise suppression operation may be performed on the pixel of interest based on the pixels of the second region to obtain a suppressed U channel value, which may act as the U channel false color correction value of the pixel of interest (or referred to as a first correction value) and a suppressed V channel value of the pixel of interest, which may function as the V channel false color correction value of the pixel of interest (or referred to herein as a second correction value).

Various color noise suppression techniques may be used to implemented the above purpose, and not be limited to the embodiments of the present disclosure. In order to obtain a better color noise suppression effect, a color noise suppression technique used in the embodiments of the present disclosure is shown below.

The first region may be layered by using Gaussian Pyramid technology to obtain a plurality of image layers (or referred to as original image layers) from low frequency to high frequency. The color noise suppression operation may be performed on the image layers (or referred to as original image layers) in an order from the low frequency image layer to the high frequency image layer. A suppressed image layer may be reconstructed to update the original next layer image to obtain an updated next level image layer. For example, a color noise suppression operation may be performed on the Kth original image layer to obtain a suppressed Kth image layer, which may be reconstructed to update the (K+1)th image layer to obtain an updated (K+1)th image layer. The updated (K+1)th image layer may further be suppressed to obtain a suppressed updated (k+1)th image layer, which may further be reconstructed to update the (K+2) the image layer to obtain an updated (K+2)th image.

The above operations may be repeated until an updated image layer with the lowest frequency, that is, an updated Nth image layer is obtained by reconstructing. The suppressed color channel values (e.g., a suppressed U channel value, a suppressed V channel value) of the pixel of interest may be obtained based on the color channel (e.g., an U channel value, a V channel value) of the pixel corresponding to the position of the pixel of interest. The pixel may be the pixel of the updated image layer with the lowest frequency.

Figure 13:
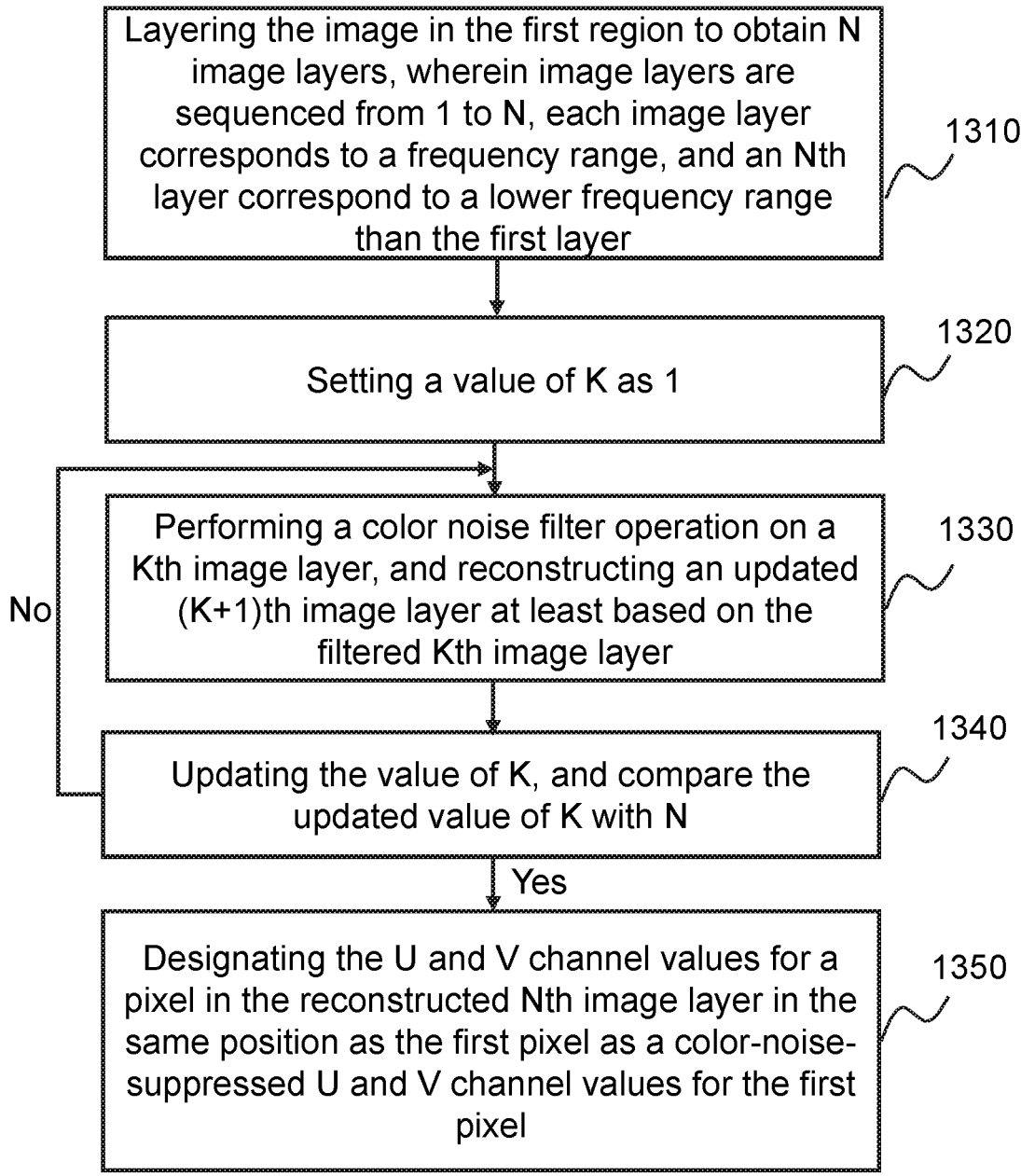
FIG. 13 is a flowchart illustrating an exemplary process and/or method for obtaining suppressed color channel value for a certain pixel according to some embodiments of the present disclosure.

Referring to FIG. 13, FIG. 13 is a flowchart of an exemplary process 1300 for obtaining suppressed color channel value according to some embodiments of the present disclosure. In some embodiments, one or more steps in the process and/or method 1300 may be implemented in the image processing system 100 illustrated in FIG. 1. For example, one or more steps in the process and/or method 1300 may be stored in the storage device 130 and/or the storage (e.g., the ROM 230, the RAM 240) as a form of instructions, and invoked and/or executed by the processor 130 (e.g., the processing engine 112 in the processor 130, or the processor 220 of the processing engine 112 in the processor 130).

In 1310, the image in the first region may be layered to obtain N image layers. According to an order from high frequency range to low frequency range, the N image layers (or referred to as original image layers) may be sequenced from 1 to N. Each image layer corresponds to a frequency range, and an Nth layer correspond to a lower frequency range than the 1st image layer.

In 1320, the value of K may be set as 1, and the process 1300 may proceed to 1330.

In 1330, a color noise filter operation may be performed on the Kth image layer, and an updated (K+1)th image layer may be obtained (e.g., reconstructed) at least based on the filtered Kth image layer. In some embodiments, the updated (K+1)th image may be obtained based on the filtered Kth image and the original (K+1)th image.

In some embodiments, a bilateral filtering technique may be used to filter the color noise of the Kth image layer. For example, if the Kth image layer includes L*L pixels, the intensity weight and physical distance weight of each pixel to the center pixel in the Kth image layer may be determined, respectively. The U channel and the V channel of the Kth image layer may be bilaterally filtered based on the intensity weights and the physical distance weights. The bilateral filter operation of the U channel value of the Kth image layer may be performed according to the following equation (31) to obtain U channel layer color noise suppression result cnr_u_L*L:

$$cnr\_u\_L*L = \frac{\sum_{k=0,l=0}^{L,L} inData\_uL*L(k,l)w(k,l)}{\sum_{k=0,l=0}^{L,L} w(k,l)} \quad (31)$$

$$w(k,l) = d(k,l)*r(k,l)$$

$$d(k,l) = e^{-\left(\frac{(L/2-k)^2+(L/2-l)^2}{2\sigma_d^2}\right)}$$

$$r(k,l) = e^{-\left(\frac{(inData\_u\_L*L(L/2,L/2)-inData\_u\_L*L(k,l))^2}{2\sigma_r^2}\right)}$$

wherein $\sigma_d$ and $\sigma_r$ denote pre-calibrate parameters, the values of $\sigma_d$ and $\sigma_r$ of different image layers may be set according to image noise level. d(k,l) refers to the physical distance weight of the pixel having a coordinate of (k,l) in the Kth image layer to the center pixel of the Kth image layer, r(k,l) refers to the intensity weight of the pixel having a coordinate of (k,l) in the Kth image layer to the center pixel of the Kth image layer, inData_uL*L(L/2,L/2) refers to the U channel value of a pixel having a coordinate of (L/2,L/2) in the Kth image layer, inData_uL*L(k,l) refers to the U channel value of a pixel having a coordinate of (k,l) in the Kth image layer.

The bilateral filter operation of the V channel value of the Kth image layer may be performed according to the following equation (32) to obtain V channel layer color noise suppression result cnr_v_L*L:

$$cnr\_v\_L*L = \frac{\sum_{k=0,l=0}^{L,L} inData\_vL*L(k,l)w(k,l)}{\sum_{k=0,l=0}^{L,L} w(k,l)} \quad (32)$$

$$w(k,l) = d(k,l)*r(k,l)$$

$$d(k,l) = e^{-\left(\frac{(L/2-k)^2+(L/2-l)^2}{2\sigma_d^2}\right)}$$

$$r(k,l) = e^{-\left(\frac{(inData\_vL*L(L/2,L/2)-inData\_vL*L(k,l))^2}{2\sigma_r^2}\right)}$$

wherein $\sigma_d$ and $\sigma_r$ denote pre-calibrate parameters, the values of $\sigma_d$ and $\sigma_r$ of different image layer may be set according to image noise level. d(k,l) refers to the physical distance weight of the pixel having a coordinate of (k,l) in the Kth image layer to the center pixel of the Kth image layer, r(k,l) refers to the intensity weight of the pixel having a coordinate of (k,l) in the Kth image layer to the center pixel of the Kth image layer, inData_vL*L(L/2,L/2) refers to the V channel value of a pixel having a coordinate of (L/2, L/2) in the Kth image layer, inData_vL*L(k,l) refers to the V channel value of a pixel having a coordinate of (k,l) in the Kth image layer.

In 1340, the value of K may be updated (e.g., increasing by 1), and the updated value of K may be compared with N. If the updated value of K is smaller than N, process 1300 may proceed to 1330. Otherwise, process 1300 may proceed to 1350.

In 1350, the U channel value and the V channel value for the pixel in the reconstructed Nth image layer in the same position as the first pixel may be designated as the color-noise-suppressed U and V channel values for the first pixel.

Returning to FIG. 11B, in 1160, the electronic device may perform a weighted mean operation on the obtained false color correction values for the U and V channel values for the first pixel and the obtained color-noise-suppressed U and V channel values for the first pixel based on a second weight factor, to obtain corrected U and V channel values for the first pixel.

A final channel corrected value (e.g., a corrected U channel value and/or a corrected V channel value (or referred to herein as a target correction value) may be determined based on a second weight (or referred to herein as a second weight factor), the suppressed channel values, and the false color correction value. Specifically, a weighted mean operation may be performed on the U channel false color correction value of the pixel of interest and the suppressed U channel value of the pixel of interest to obtain the corrected U channel value of the pixel of interest based on the second weight, a weighted mean operation may be performed on the V channel false color correction value of the pixel of interest and the suppressed V channel value of the pixel of interest to obtain the corrected V channel value of the pixel of interest based on the second weight.

In some embodiments, the second weight may be a preset value. The range of the second weight may be (0, 1). In some embodiments, the value of the second weight may be related to the ambient brightness.

In some embodiments, the corrected U channel value may be determined according to the following equation (33):

$$output\_u = alpha*cnr\_u + (1-alpha)*fcc\_u \quad (33)$$

In some embodiments, the corrected V channel value may be determined according to the following equation:

$$output\_v = alpha*cnr\_v + (1-alpha)*fcc\_v \quad (34)$$

wherein fcc_u refers to the U channel false color correction value, fcc_v refers to the V channel false color correction value, cnr_u refers to the suppressed U channel value, cnr_v refers to the suppressed V channel value, alpha represents the second weight factor. As used herein, (1-alpha) refers to a third weight factor for the first correction values.

Based on the equations (33) and (34), the smaller the ambient brightness (the darker the environment), the more serious the noise. The second weight alpha may be set to be relatively large (e.g., larger than 0.5). Conversely, the bigger the ambient brightness (that is, the brighter the environment), the smaller the noise. The second weight alpha may be set to be relatively small (e.g., no larger than 0.5).

Based on the above operations, false color correction and color noise suppression may be performed for each pixel of the image, or for each pixel of false color area of the image.

After false color correction and color noise suppression, a situation that the U channel or V channel of the pixel of interest exceeds 128 (e.g., when saturation is zero) may be occurred, i.e., changing from one color to another, such as changing from red to blue. The situation may be called overcorrection. In order to avoid the overcorrection, an overcorrection protection technique may be provided in the present disclosure. For pixels where U channel or V channel overcorrection occurs, the overcorrection protection technique may correct the value of the corresponding channel (e.g., U channel and/or V channel) to 128.

Specifically, the following operations may be performed after operation 1160 to avoid the overcorrection.

In 1170, for the corrected first pixel, whether the U channel value of the corrected first pixel and the V channel value of the corrected first pixel are overcorrected may be determined, respectively. If the U channel value is overcorrected, the U channel value may be corrected to 128 in operation 1180; otherwise, the U channel value may be remained unchanged. If the V channel value is overcorrected, the V channel value may be corrected to 128 in operation 1180; otherwise, the U channel value may be remained unchanged in operation 1190.

The following techniques may be used to determine whether the U channel value of the pixel of interest in the first region is overcorrected. If a difference obtained by subtracting the zero saturation U channel value (i.e., 128) from the suppressed U channel value, and a difference obtained by subtracting the zero saturation U channel value from the U channel value (i.e., 128) of the pixel of interest before correction are both greater than zero, or both less than zero, the corrected U channel value of the pixel of interest may not be overcorrected. Otherwise, the corrected U channel value of the pixel of interest may be overcorrected.

Similarly, the above techniques may be used to determine whether the V channel value of the pixel of interest in the first region is overcorrected. If a difference obtained by subtracting the zero saturation V channel value (i.e., 128) from the suppressed V channel value, and a difference obtained by subtracting the zero saturation V channel value (i.e., 128) from the V channel value of the pixel of interest before correction are both greater than zero, or both less than zero, the corrected V channel value of the pixel of interest may not be overcorrected. Otherwise, the corrected V channel value of the pixel of interest may be overcorrected.

In conclusion, the image processing technique provided in the embodiments of the present disclosure may determine a first weight based on the pixels processed in the image, and then obtain a false color pre-correction value and a false color correction value of the U channel and the V channel of the pixel of interest in the image. The color noise suppression may also performed on the second region. Finally, the correction values (e.g., the false color correction value and a color-noise-suppressed value) may be mixed to perform an image processing process more efficiently, thereby the logic redundancy may be reduced.

In the above embodiments, both false color correction and color noise suppression may be implemented by performing the operations 1110 to 1160. In some embodiments, only false color correction may be implemented. The detail techniques may be similar to the above descriptions, and not repeated herein.

Figure 14:
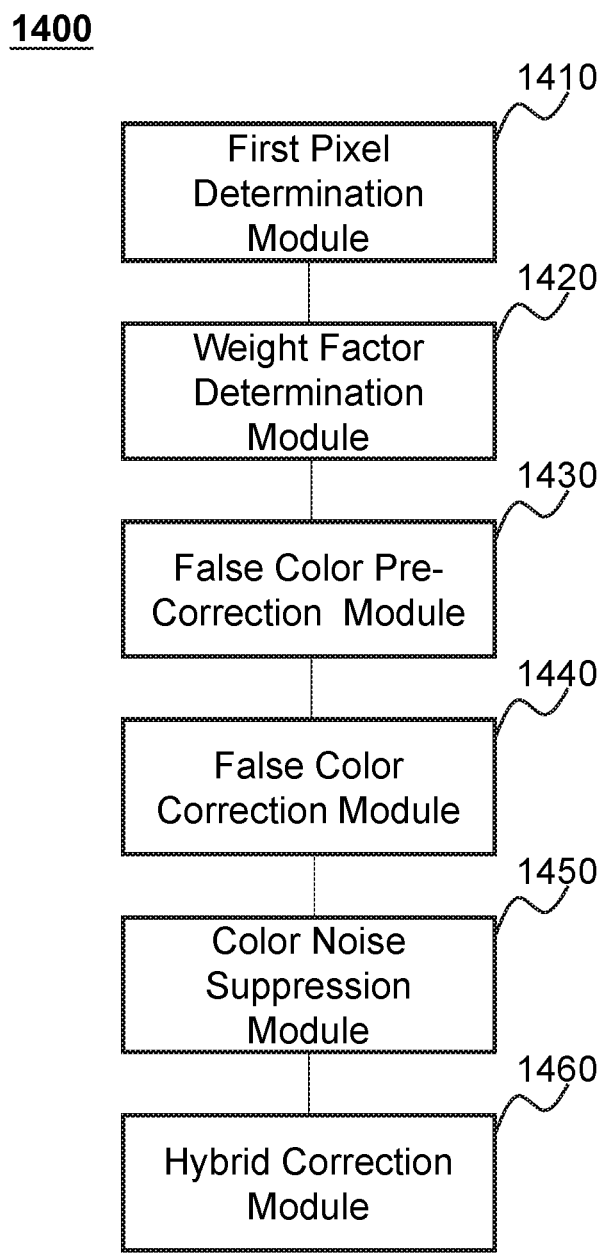
FIG. 14 is a block diagram illustrating an exemplary image processing device according to some embodiments of the present disclosure.

FIG. 14 is a block diagram illustrating an exemplary image processing device 1400 according to some embodiments of the present disclosure. The image processing device 1400 may include a first pixel determination module 1410, a weight factor determination module 1420, a false color pre-correction module 1430, a false color correction module 1440, a color noise suppression module 1450, and a hybrid correction module 1460.

The first pixel determination module 1410 may be configured to determine the pixel of interest, and a first region and a second region both centered on the pixel of interest. The first region may be smaller than the second region.

The weight factor determination module 1420 may be configured to determine pixels that satisfy a first condition in the first region, and determine a first weight corresponding to the pixel of interest of the first region based on an average value of differences between the saturation information of the pixels satisfying the first condition and a preset threshold. The pixels that satisfy the first condition in the first region may be the pixels having a saturation information smaller than the preset value. The saturation information of a pixel may be a larger value between a first absolute value of U channel saturation difference and a second absolute value of V channel saturation difference. The U channel saturation difference may be equal to an U channel value minus a zero saturation U channel value, the V channel saturation difference is equal to a V channel value minus a zero saturation V channel value.

The false color pre-correction module 1330 may be configured to perform a weighted mean operation on an U channel value of the pixel of interest and an U channel average value corresponding to the first region to obtain an U channel false color pre-correction value of the pixel of interest based on the first weight, and perform a weighted mean operation on a V channel value of the pixel of interest and a V channel average value corresponding to the first region to obtain a V channel false color pre-correction value of the pixel of interest based on the first weight. The U channel average value of the first region is an average value of the U channel value of the pixels that satisfy the first condition in the first region, the V channel average value of the first region is an average value of the V channel value of the pixels that satisfy the first condition in the first region.

The false color correction module 1440 may be configured to perform a weighted mean operation on the U channel value of the pixel of interest and a median-filtered U channel value of the first region to obtain an U channel false color correction value of the pixel of interest based on the first weight, and perform a weighted mean operation on the V channel value of the pixel of interest and a median-filtered V channel value of the first region to obtain a V channel false color correction value of the pixel of interest based on the first weight. The median-filtered U channel value and the median-filtered V channel value may be obtained based on the U channel false color pre-correction value of the pixel of interest and the V channel false color pre-correction value of the pixel of interest.

The color noise suppression module 1450 may be configured to suppress color noise of the pixel of interest based on the pixels in the second region to obtain a suppressed U channel value of the pixel of interest and a suppressed V channel value of the pixel of interest.

The hybrid correction module 1460 may be configured to perform a weighted mean operation on the U channel false color correction value and the suppressed U channel value to obtain a corrected U channel value of the pixel of interest based on a second weight, and perform a weighted mean operation on the V channel false color correction value and the suppressed V channel value to obtain a corrected V channel value of the pixel of interest based on the second weight.

In some embodiments, the image processing device 1400 may further include an overcorrection protection module. The overcorrection protection module may be configured to execute the one or more following operations. After determining the corrected U channel value and the corrected V channel value of the pixel of interest, if a difference obtained by subtracting the zero saturation U channel value from the suppressed U channel value and a difference obtained by subtracting the zero saturation U channel value from the U channel value of the pixel of interest are both greater than zero, or both less than zero, the U channel value of the pixel of interest may be corrected to the corrected U channel value. Otherwise, the U channel value of the target value may be corrected to the zero saturation U channel value.

If a difference obtained by subtracting the zero saturation V channel value from the suppressed V channel value and a difference obtained by subtracting the zero saturation V channel value from the V channel value of the pixel of interest are both greater than zero, or both less than zero, the V channel value of the pixel of interest may be corrected to the corrected V channel value. Otherwise, the V channel value of the pixel of interest may be corrected to the zero saturation V channel value.

In some embodiments, the weight factor determination module 1420 may be configured to perform one or more of the following operations.

A set of pixels that satisfy the first condition in the first region may be determined.

An accumulated value which is the sum of the differences between the saturation of each pixel and the preset threshold. The differences may be obtained by subtracting the saturation from the preset threshold; and The first weight factor corresponding to the first region may be determined based on the accumulated value and the number of the pixels that satisfy the first condition.

In some embodiments, the color noise suppression module 1450 may be configured to perform one or more of the following operations.

The image may be layered based on the pixels in the second region to obtain N image layers from the low frequency image layer to the high frequency image layer. K may be an integer greater than 1.

The following operation may be performed from an image layer corresponding to the lowest frequency. The color noise suppression operation may be performed on the image layer, and another image layer corresponding to a higher frequency than the image layer may be obtained by reconstructing based on the suppressed image layer. A bilateral filtering operation may be performed on each image layer.

In some embodiments, the hybrid correction module 1460 may perform a weighted mean operation on the U channel false color correction value and the suppressed U channel according to the equation (33). In some embodiment, the hybrid correction module 1460 may perform a weighted mean operation on the V channel false color correction value and the suppressed V channel according to the equation (34).

In some embodiments, only false color correction may be implemented by a device that is similar to that described in the above embodiments and may not be repeated herein.

Furthermore, the recited order of processing elements or sequences, or the use of numbers, letters, or other designations therefore, may be not intended to limit the claimed processes and methods to any order except as may be specified in the claims. Although the above disclosure discusses through various examples what may be currently considered to be a variety of useful embodiments of the disclosure, it may be to be understood that such detail may be solely for that purposes, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purposes of streamlining the disclosure aiding in the understanding of one or more of the various inventive embodiments. This method of disclosure, however, may be not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein may be hereby incorporated herein by this reference in its entirety for all purposes, excepting any prosecution file history associated with same, any of same that may be inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and describe.

What is claimed is:

1. A system for image restoration processing, comprising:
   a storage device storing an image acquired by an image sensor, the obtained image including a plurality of channels and a plurality of pixels, each pixel having a pixel value corresponding to one of the plurality of channels; and
   at least one processor, wherein during operation, the at least one processor is configured to:
   select one of the plurality of pixels as a pixel of interest;
   designate the corresponding channel of the pixel value of the pixel of interest as a target channel;
   select a plurality of pixels proximate to the pixel of interest, wherein the plurality of pixels proximate to the pixel of interest include at least two first reference pixels, wherein the first reference pixels have pixel values corresponding to a same first reference channel different from the target channel;

for each first reference pixel, determine a pseudo pixel value for the target channel of the first reference pixel;

determine that the pixel of interest is deteriorated at least based on the pixel value of the pixel of interest, and the determined pseudo pixel values of the first reference pixels for the target channel; and create, upon a determination that the pixel of interest is deteriorated, a restored image.

2. The system of claim 1, wherein the at least one processor is configured to:

select at least two second reference pixels within the plurality of pixels proximate to the pixel of interest, each second reference pixel having a pixel value corresponding to the target channel; and determine that the pixel of interest is deteriorated at least based on the pixel value of the pixel of interest, the determined pseudo pixel values for the target channel of the first reference pixels, and the pixel values of the second reference pixels.

3. The system of claim 2, wherein the at least one processor is configured to:

select at least two third reference pixels within the plurality of pixels proximate to the pixel of interest, wherein the third reference pixels have pixel values corresponding to a same second reference channel different from the target channel and the first reference channel;

for each third reference pixel, determine a pseudo pixel value for the target channel of the third reference pixel; and determine that the pixel of interest is deteriorated based on the pixel value of the pixel of interest, the determined pseudo pixel values for the target channel of the first reference pixels, the pixel values of the second reference pixels, and the determined pseudo pixel values for the target channel of the third reference pixels.

4. The system of claim 3, wherein the at least one processor is configured to:

determine a maximum pixel value among the determined pseudo pixel values for the target channel of the first reference pixels, the pixel values of the second reference pixels, and the determined pseudo pixel values for the target channel of the third reference pixels;

determine a difference between the pixel value of the pixel of interest and the maximum pixel value;

determine that the pixel of interest is deteriorated at least based on that the pixel value of the pixel of interest is larger than the maximum pixel value, and that the difference between the pixel value of the pixel of interest and the maximum pixel value exceeds a threshold.

5. The system of claim 3, wherein the at least one processor is configured to:

determine a minimum pixel value among the determined pseudo pixel values for the target channel of the first reference pixels, the pixel values of the second reference pixels, and the determined pseudo pixel values for the target channel of the third reference pixels;

determine a difference between the pixel value of the pixel of interest and the minimum pixel value;

determine that the pixel of interest is deteriorated at least based on that the pixel value of the pixel of interest is smaller than the minimum pixel value, and that the difference between the pixel value of the pixel of interest and the minimum pixel value exceeds a threshold.

6. The system of claim 1, wherein the pixel of interest and the plurality of pixels proximate to the pixel of interest are in a region, and the at least one processor is configured to:

determine a color difference corresponding to the region; and for each first reference pixel in the region, determine the pseudo pixel value for the target channel of the first reference pixel based on the pixel value of the first reference pixel and the color difference corresponding to the region.

7. The system of claim 6, wherein the at least one processor is configured to:

for each pixel in the region, determine a color difference value corresponding to the pixel;

determine a mean of the color difference values corresponding to the pixels in the region as the color difference corresponding to the region.

8. The system of claim 7, wherein the at least one processor is configured to:

for one first reference pixel, select at least two pixels corresponding to the target channel and adjacent to the first reference pixel;

determine a mean of the pixel values of the selected pixels;

determine a difference between the pixel value of the first reference pixel and the determined mean as the color difference corresponding to the first reference pixel.

9. The system of claim 1, wherein the at least one processor is further configured to:

correct the pixel value of the pixel of interest at least based on the determined pseudo pixel values for the target channel of the first reference pixels.

10. The system of claim 9, wherein the at least one processor is configured to:

select a second reference pixel pair adjacent to the pixel of interest and a first reference pixel pair adjacent to the pixel of interest in the first reference pixels;

determine a first difference between pseudo pixel values for the target channel of the two pixels in the second reference pixel pair;

determine a second difference between pseudo pixel values for the target channel of the two pixels in the first reference pixel pair;

upon determining that the first difference is smaller than the second difference, correct the pixel value of the pixel of interest as one of the pseudo pixel values for the target channel of the two pixels of the first reference pixel pair.

11. The system of claim 1, wherein the pixel of interest and the plurality of pixels are in a region centered on the pixel of interest.

12. A system for processing images, comprising at least one processor, wherein during operation, the at least one processor is configured to:

obtain an image including a plurality of pixels;

select one of the plurality of pixels as a pixel of interest;

select a first region and a second region according to the pixel of interest;

perform a false color correction operation on the pixel of interest based on at least some of a plurality of pixels in the first region to determine a first correction value for the pixel of interest, the first correction value being relating to the false color in the pixel of interest;

perform a color noise suppression operation on the pixel of interest based on at least some of a plurality of pixels in the second region to determine a second correction value for the pixel of interest, the second correction value being relating to the color noise in the pixel of interest;

determine a target correction value for the pixel of interest at least based on the determined first correction value and the second correction value; and correct the pixel of interest based on the determined target correction value.

13. The system of claim 12, wherein the at least one processor is further configured to:

generate a corrected image at least based on the corrected pixel of interest; and display the corrected image on a display.

14. The system of claim 12, wherein to determine the target correction value, the at least one processor is configured to:

obtain a second weight factor for the second correction value;

determine a third weight factor for the first correction value based on the second weight factor; and determine the target correction value as a first weighted mean that is determined based on the second weight factor, the second correction value, the third weight factor, and the first correction value.

15. The system of claim 12, wherein to determine a first correction value for the pixel of interest, the at least one processor is configured to:

obtain a first weight factor for a value of a chrominance channel for the pixel of interest;

perform a median filtering operation on the pixel of interest to determine a median value corresponding to the first region;

determine a fourth weight factor for the median value based on the first weight factor; and determine the first correction value for the pixel of interest as a second weighted mean that is determined based on the first weight factor, the value of chrominance channel for the pixel of interest, the fourth weight factor, and the determined median value corresponding to the first region.

16. The system of claim 15, wherein to determine the median value corresponding to the first region, the at least one processor is configured to:

determine a value of a chrominance channel for the first region;

determine a third weighted mean based on the first weight factor, the value of the chrominance channel for the pixel of interest, the fourth factor, and the value of the chrominance channel for the first region, the fourth weight factor corresponding to the value of the chrominance channel for the first region; and perform the median filtering operation on the pixel of interest based on the value of the chrominance channel for the pixel of interest and the third weighted mean.

17. The system of claim 15, wherein the first region includes a plurality of pixels, and wherein to determine the value of the chrominance channel for the first region, the at least one processor is configured to:

for each pixel in the first region, determine a value of a chrominance channel for the pixel; and determine a mean of the determined values of the chrominance channels for the pixels to be the value of the chrominance channel for the first region.

18. The system of claim 15, wherein the first region includes a plurality of pixels, and wherein to obtain the first weight factor, the at least one processor is configured to:

for each of at least some of the pixels in the first region, determine a difference between a value of a chrominance channel for the pixel and a threshold; and determine a mean of the determined differences to be the first weight factor.

19. The system of claim 12, wherein the first region and the second region is centered on the pixel of interest.

20. The system of claim 12, wherein the second region is larger than the first region.

* * * * *